US010644350B2

(12) United States Patent
Chang et al.

(10) Patent No.: US 10,644,350 B2
(45) Date of Patent: May 5, 2020

(54) SECONDARY BATTERY INCLUDING ORGANIC-INORGANIC HYBRID NANOPOROUS MATERIAL AS WATER ADSORBENT

(71) Applicant: KOREA RESEARCH INSTITUTE OF CHEMICAL TECHNOLOGY, Daejeon (KR)

(72) Inventors: Jong San Chang, Daejeon (KR); Young Kyu Hwang, Daejeon (KR); Kyung Ho Cho, Gyeonggi-do (KR); U Hwang Lee, Daejeon (KR); Sue Kyung Lee, Daejeon (KR); Do Young Hong, Gyeonggi-do (KR); Dong Won Hwang, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 121 days.

(21) Appl. No.: 15/924,033

(22) Filed: Mar. 16, 2018

(65) Prior Publication Data

US 2018/0261882 A1    Sep. 13, 2018

Related U.S. Application Data

(63) Continuation-in-part of application No. PCT/KR2016/010412, filed on Sep. 19, 2016.

(30) Foreign Application Priority Data

Sep. 18, 2015  (KR) .......................... 10-2015-0132364

(51) Int. Cl.
*H01M 10/0564* (2010.01)
*B01J 20/22* (2006.01)
(Continued)

(52) U.S. Cl.
CPC ....... *H01M 10/0564* (2013.01); *B01J 20/223* (2013.01); *B01J 20/226* (2013.01);
(Continued)

(58) Field of Classification Search
CPC ......... H01M 10/0564; H01M 10/4235; H01M 10/0525; H01M 4/60; H01M 2/16; B01J 20/223; B01J 20/226
See application file for complete search history.

(56) References Cited

U.S. PATENT DOCUMENTS

2011/0118490 A1* 5/2011 Hwang ................. C07F 11/005
556/44
2016/0336619 A1* 11/2016 Choi ................. H01M 10/0565
(Continued)

FOREIGN PATENT DOCUMENTS

JP          2015-005496         1/2015
KR       1020070092592       9/2007
(Continued)

OTHER PUBLICATIONS

Furukawa et al., "Water adsorption in Porous Metal—Organic Frameworks and Related Materials," *Journal of the American Chemical Society*, 136:4369-4381, (2014).
(Continued)

*Primary Examiner* — Stewart A Fraser
(74) *Attorney, Agent, or Firm* — Norton Rose Fulbright US LLP

(57) ABSTRACT

Provided is a secondary battery having a battery case which accommodates an electrode assembly including a cathode, an anode, and a separator disposed between the cathode and the anode, together with an electrolyte, wherein one or more selected from the group consisting of the cathode, the anode, the separator, the electrolyte, and the interior of the battery case include, as a water adsorbent, a first organic-inorganic
(Continued)

hybrid nanoporous material which may be regenerated by desorbing 70% or more of a total adsorption amount of adsorbed water at 150° C. or lower; and optionally, a second organic-inorganic hybrid nanoporous material, of which water adsorption capacity is higher than water desorption capacity at a relative humidity p/p0 of 0.3 or less (herein, p0 represents a saturated vapor pressure at an application temperature and p represents a vapor pressure upon adsorption).

20 Claims, 15 Drawing Sheets

(51) Int. Cl.
| | |
|---|---|
| *H01M 10/0525* | (2010.01) |
| *H01M 10/42* | (2006.01) |
| *H01M 10/052* | (2010.01) |
| *H01M 4/62* | (2006.01) |
| *H01M 2/16* | (2006.01) |
| *H01M 10/0567* | (2010.01) |
| *H01M 4/13* | (2010.01) |
| *B01J 20/28* | (2006.01) |
| *B01J 20/30* | (2006.01) |
| *H01M 4/60* | (2006.01) |
| *H01M 10/0562* | (2010.01) |
| *H01M 10/0565* | (2010.01) |

(52) U.S. Cl.
CPC ..... *B01J 20/28011* (2013.01); *B01J 20/3085* (2013.01); *H01M 2/16* (2013.01); *H01M 4/13* (2013.01); *H01M 4/60* (2013.01); *H01M 4/62* (2013.01); *H01M 10/052* (2013.01); *H01M 10/0525* (2013.01); *H01M 10/0567* (2013.01); *H01M 10/4235* (2013.01); *H01M 10/0562* (2013.01); *H01M 10/0565* (2013.01); *H01M 2300/0065* (2013.01); *Y02C 10/08* (2013.01); *Y02T 10/7011* (2013.01)

(56) References Cited

U.S. PATENT DOCUMENTS

| | | | |
|---|---|---|---|
| 2017/0012277 A1* | 1/2017 | Wang | H01M 4/134 |
| 2017/0279109 A1* | 9/2017 | Wang | H01M 4/0471 |

FOREIGN PATENT DOCUMENTS

| | | |
|---|---|---|
| KR | 1020140091107 | 7/2014 |
| WO | WO 2014/104687 | 7/2014 |

OTHER PUBLICATIONS

International Search Report issued in International Application No. PCT/KR2016/010412, dated Jan. 20, 2017.

* cited by examiner

SECONDARY BATTERY INCLUDING ORGANIC-INORGANIC HYBRID NANOPOROUS MATERIAL AS WATER ADSORBENT

CROSS-REFERENCE TO RELATED APPLICATIONS

This application is a continuation-in-part of International Application No. PCT/KR2016/010412 filed Sep. 19, 2016, which claims the benefit of priority of Republic of Korea Patent Application No. 10-2015-0132364 filed Sep. 18, 2015. The entire contents of each of the above-referenced applications are incorporated into the present application by reference.

BACKGROUND OF THE INVENTION

1. Field of the Invention

The present invention relates to a secondary battery comprising an organic-inorganic hybrid nanoporous material as a water adsorbent.

2. Description of the Related Art

As technology development and demands for mobile devices increase, demands for secondary batteries as energy sources are rapidly increasing. Among the secondary batteries, lithium secondary batteries having high energy density and voltage, a long cycle life, and a low self-discharge rate have been commercialized and widely used.

The lithium secondary batteries are largely classified into a cylinder-type battery, a polygon-type battery, and a pouch-type battery according to their shape, and also classified into a lithium ion battery, a lithium ion polymer battery, and a lithium polymer battery according to the type of an electrolyte.

Meanwhile, during a manufacturing process of the lithium secondary battery, water may be included inside an active material or a small amount of water may exist in an electrolyte, and particularly, in the case of the pouch-type case, water is very likely to penetrate through sealing parts, etc. When water is present inside the battery, water and the electrolyte react with each other by a potential energy provided during a charging process, which causes the battery to swell due to gas generation. Further, water in the battery reacts with components of the battery to generate reaction products, such as HF, etc. HF destroys SEI layer and causes dissolution of a cathode. This phenomenon occurs more remarkably at a high temperature so that serious problems may be generated in terms of safety of the battery.

In particular. $LiPF_6$ lithium salts, which are mainly used in high-voltage and high-capacity batteries, react with water to form a strong acid HF. The formed HF spontaneously reacts with a weakly basic electrode active material to elute the electrode active material components, resulting in degradation of the battery. Further, HF forms lithium fluoride (LiF) on the surface of the cathode to increase electric resistance in the electrode and to generate gas, leading to a reduction of the lifetime of the battery.

Further, HF reacts with a silicon (Si) component of a glass container, which is commonly used for electrolyte preparation, to produce silicon precipitates. The silicon precipitates thus produced are adsorbed onto the surface of the battery during charge/discharge of the battery, thereby reducing a reaction area. Thus, charge/discharge efficiency of the battery is rapidly reduced, and consequently, the life-time of the battery is reduced due to reaction with the electrode. Further, when an initial concentration of HF is above a predetermined concentration (usually, 150 ppm), HF may cause a rapid oxidation reaction, thereby deteriorating performance of the anode.

To solve the problems caused by the hydrolysis side reaction of $LiPF_6$, an approach to fundamentally remove water in an electrode active material composition as described below and an approach to inhibit reactivity of the produced HF have been suggested.

According to the known method of removing water in the electrode active material composition, an active material slurry is coated onto an electrode and then dried by hot air, etc., thereby removing a solvent and water in the slurry coated onto a metal current collector. However, there is a problem that water is not completely removed only by this drying process. Particularly, in the case of LFP battery using $LiFePO_4$ as a cathode active material, water removal in the electrode active material composition is more problematic because of high water absorption and difficulty of water removal due to the nature of the material. However, there has been no satisfactory method capable of solving the problem caused by $LiPF_6$ hydrolysis.

Meanwhile, when the lithium secondary battery is stored at a high temperature in a fully charged state (e.g., left at 85° C. for 4 days after being 100% charging at 4.2 V), a anode is exposed as the SEI film slowly breaks down over time. The surface of the exposed anode reacts with the surrounding electrolyte to continuously cause side reactions, resulting in generation of gases such as CO, $CO_2$, $CH_4$, $C_3H_6$, etc. As a result, an internal pressure of the battery is increased and swelling of the battery occurs to deteriorate safety. Thus, there are problems in that storage characteristics and lifetime characteristics of the battery are deteriorated.

Accordingly, there is an urgent demand for a technology capable of solving the problems.

SUMMARY OF THE INVENTION

In the present invention, a water adsorbent is introduced inside a secondary battery to prevent side reactions by water, thereby improving reliability of the battery.

DETAILED DESCRIPTION OF THE PREFERRED EMBODIMENTS

Figure 1:
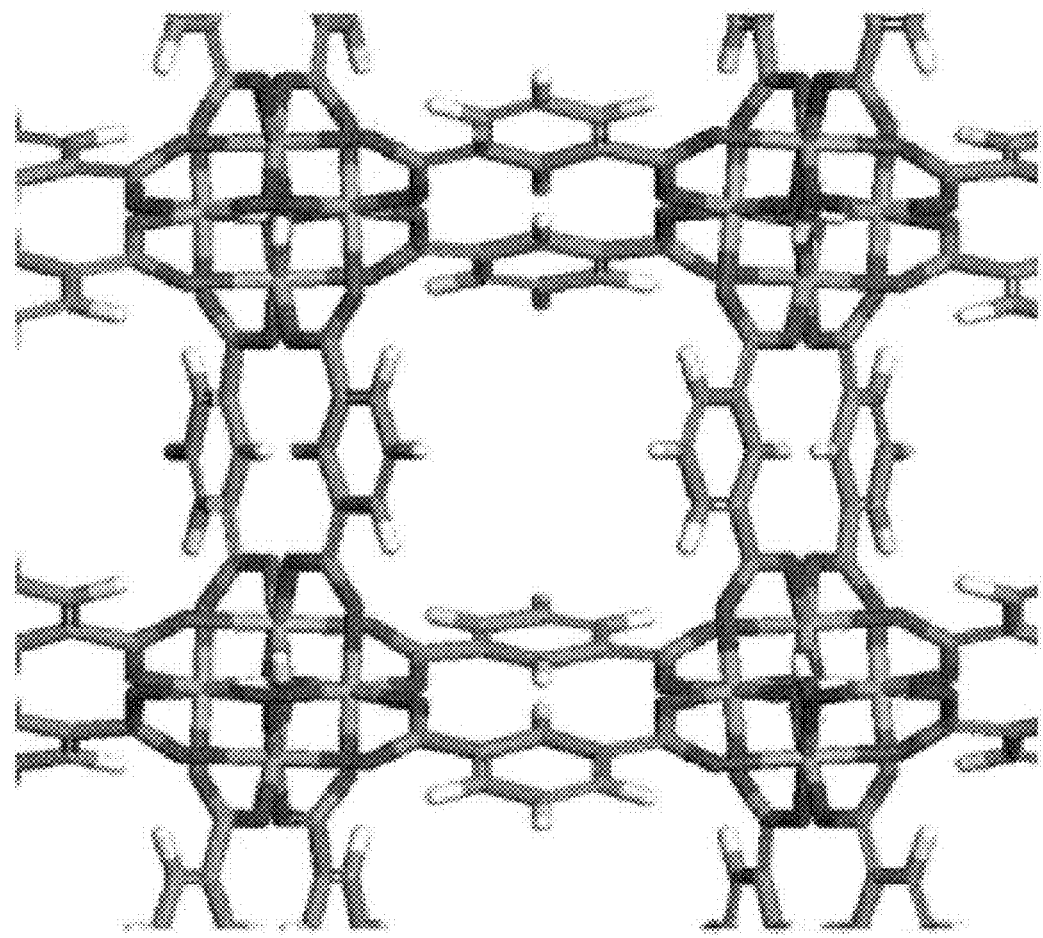
FIG. 1 shows a structure of Al(OH)BDC organic-inorganic hybrid nanoporous material.

A first aspect of the present invention provides a secondary battery having a battery case which accommodates an electrode assembly including a cathode, an anode, and a separator disposed between the cathode and the anode, together with an electrolyte, wherein one or more selected from the group consisting of the cathode, the anode, the separator, the electrolyte, and the interior of the battery case include a first organic-inorganic hybrid nanoporous material as a water adsorbent which may be regenerated by desorbing 70% or more, preferably 80% or more of a total adsorption amount of adsorbed water at 150° C. or lower.

The secondary battery may be a lithium ion battery, a lithium ion polymer battery, or a lithium polymer battery.

A second aspect of the present invention provides a battery module including the secondary battery according to the first aspect as a unit battery.

A third aspect of the present invention provides a battery pack including the battery module according to the second aspect.

A fourth aspect of the present invention provides a device including the battery pack according to the third aspect as a power source.

A fifth aspect of the present invention provides an electrolyte including, as a water adsorbent, a first organic-inorganic hybrid nanoporous material which may be regenerated by desorbing 70% or more, preferably 80% or more of a total adsorption amount of adsorbed water at 150° C. or lower; a second organic-inorganic hybrid nanoporous material, of which water adsorption capacity is higher than water desorption capacity at a relative humidity p/p0 of 0.3 or less (herein, p0 represents a saturated vapor pressure at an application temperature and p represents a vapor pressure upon adsorption); or both of them.

A sixth aspect of the present invention provides an electrode active material composition including, as a water adsorbent, a first organic-inorganic hybrid nanoporous material which may be regenerated by desorbing 70% or more, preferably 80% or more of a total adsorption amount of adsorbed water at 150° C. or lower; a second organic-inorganic hybrid nanoporous material, of which water adsorption capacity is higher than water desorption capacity at a relative humidity p/p0 of 0.3 or less (herein, p0 represents a saturated vapor pressure at an application temperature and p represents a vapor pressure upon adsorption); or both of them.

A seventh aspect of the present invention provides a method of manufacturing a water-removed secondary battery having a battery case which accommodates an electrode assembly including a cathode, an anode, and a separator disposed between the cathode and the anode, together with an electrolyte, the method including the step of adsorbing water during manufacturing of the battery and desorbing water during assembling of the battery by using a first organic-inorganic hybrid nanoporous material as a water adsorbent which may be regenerated by desorbing 70%, or more, preferably 80% or more of a total adsorption amount of adsorbed water at 150° C. or lower.

Hereinafter, the present invention will be described in detail.

Generally, inorganic porous materials such as zeolite, mesoporous, clay, etc have been mainly reported as water adsorption materials.

Water adsorption properties of the porous materials may be divided into 4 kinds, based on change of adsorption amount according to relative humidity in a water (H$_2$O) isotherm. First, an adsorbent strongly adsorbing water shows a rapid increase in the water adsorption amount at a relative humidity (p/p0) of 0.1 or less (a representative porous material is zeolite having micropores). An adsorbent having a moderate water adsorption strength shows a rapid increase in the water adsorption amount at a relative humidity (p/p0) of 0.1 to 0.3. An adsorbent having a water adsorption strength slightly lower than the moderate water adsorption strength shows a rapid increase in the water adsorption amount at a relative humidity (p/p0) of 0.3 to 0.6. An adsorbent having a weak water adsorption strength such as activated carbon shows a rapid increase in the water adsorption amount at a relative humidity (p/p0) of 0.7 or more.

In contrast, water desorption properties tend to be opposite to the water adsorption properties. Specifically, in the case of materials having high water adsorption strength such as zeolite, water desorption may occur at a high temperature of 200° C. or higher, and in the case of materials having a moderate to slightly low water adsorption strength such as organic-inorganic hybrid nanoporous materials, water desorption may occur at 150° C. or lower. In this regard, the degree of desorption may differ depending on the adsorption properties according to the kind of the organic-inorganic hybrid nanoporous material.

Meanwhile, in order to use the water adsorbent for an electronic device, the device must be assembled after readily removing water during a process of introducing the water adsorbent into the electronic device, because most manufacturing processes include a certain amount of water. However, as described above, the adsorption and desorption properties are opposite to each other, for example, zeolite has an advantage of high adsorption strength, whereas desorption does not easily occur during the process of manufacturing the device, and desorption easily occurs at a high temperature. Therefore, when the high-temperature heat treatment is difficult due to the characteristics of the device, zeolite cannot be used.

In the present invention, it was found that when the first organic-inorganic hybrid nanoporous material which may be regenerated by desorbing 80% or more of a total adsorption amount of adsorbed water at 150° C. or lower is used as a water adsorbent in a secondary battery, the material acts as the water adsorbent to adsorb water during manufacturing of the secondary battery, and then easily desorbs water by vacuum-treatment at a relatively low temperature of 150° C. or lower during assembling of the battery, thereby removing water from the battery. That is, it was found that the organic-inorganic hybrid nanoporous material has a relatively low water adsorption strength at a low humidity, but it may show desorption at a low temperature, and therefore, the electronic device may be manufactured in a state where water is readily removed in the process of manufacturing the device.

In the present invention, the first organic-inorganic hybrid nanoporous material which may be regenerated by desorbing 70% or more, preferably 80% or more of a total adsorption amount of adsorbed water at 150° C. or lower may belong to adsorbents having a moderate or slight low water adsorption strength, which show a rapid increase in the water adsorption amount at a relative humidity (p/p0) ranging from 0.2 to 0.6, as described above.

Preferably, the water adsorbent inside the assembled electronic device is required to have a property of not readily desorbing the adsorbed water during operation of the electronic device.

However, the adsorbent having a moderate or slight low water adsorption strength, i.e., the first organic-inorganic hybrid nanoporous material which may be regenerated by desorbing 70% or more, preferably 80% or more of a total adsorption amount of adsorbed water at 150° C. or lower may desorb gas components (moisture or carbon dioxide) adsorbed during operation of the electronic device even at a low temperature.

Further, the amount of water adsorbed from air during the process of manufacturing the device is large and the amount of water included in the electronic device during operation of the electronic device is very small (approximately <5%), and therefore, it is difficult to satisfy all the requirements by using only one kind of the organic-inorganic hybrid nanoporous material.

Accordingly, in the present invention, a second organic-inorganic hybrid nanoporous material, of which water adsorption capacity is higher than water desorption capacity at a relative humidity p/p0 of 0.3 or less (herein, p0 represents a saturated vapor pressure at an application temperature and p represents a vapor pressure upon adsorption), is further used, in addition to the first organic-inorganic hybrid nanoporous material, and as a result, the second organic-inorganic hybrid nanoporous material may effectively adsorb but may not desorb several hundreds of ppm of water which may be generated during operation of the battery, or desorbed gas components derived from the first organic-inorganic hybrid nanoporous material. Accordingly, side reactions caused by desorbed gas may be suppressed even during operation of the electronic device, thereby providing an electronic device having higher stability and reliability.

In other words, in the present invention, the first organic-inorganic hybrid nanoporous material and the second organic-inorganic hybrid nanoporous material are used in combination in the secondary battery, and thus they act as the water adsorbent to adsorb water during manufacturing of the secondary battery, and then readily desorb water by vacuum-treatment at a relatively low temperature of 150° C. or lower during assembling of the battery, thereby easily removing water from the battery. Subsequently, it is possible to effectively adsorb water generated inside the battery even at a low relative humidity of the battery during operation of the battery, thereby improving reliability of the battery.

In general, the organic-inorganic hybrid nanoporous materials are also called "porous coordination polymers" [Angew. Chem. Intl. Ed., 43, 2334, 2004], or "metal-organic frameworks (MOF)".

The organic-inorganic hybrid nanoporous material may be defined as a porous organic-inorganic polymer compound formed by binding a central metal ion to an organic ligand via a molecular coordination bond, and the organic-inorganic hybrid nanoporous material refers to a crystalline compound with molecular-sized or nano-sized pores, including both organic material and inorganic material in its framework structure. In the organic-inorganic hybrid nanoporous material, a polar metal ion and a carboxylate oxygen anion are both included in its crystalline framework, and a non-polar aromatic compound group coexists therein, and therefore, hydrophilicity and hydrophobicity are exhibited at the same time.

The organic-inorganic hybrid nanoporous materials have a large surface area and molecular-sized or nano-sized pores, and thus may be used for encapsulating guest molecules smaller than their pore size or separating molecules according to the sizes of the molecules by using their pores.

As described above, the secondary battery according to the present invention is a secondary battery having a battery case which accommodates an electrode assembly including a cathode, an anode, and a separator disposed between the cathode and the anode, together with an electrolyte, wherein one or more selected from the group consisting of the cathode, the anode, the separator, the electrolyte, and the interior of the battery case may include the first organic-inorganic hybrid nanoporous material as a water adsorbent which may be regenerated by desorbing 70% or more, preferably 80% or more of a total adsorption amount of adsorbed water at 150° C. or lower.

As used herein, the term "first organic-inorganic hybrid nanoporous material" may refer to, as described above, an organic-inorganic hybrid nanoporous material which may be regenerated by desorbing 70° % or more, preferably 80% or more of a total adsorption amount of adsorbed water at 150° C. or lower Preferably, the first organic-inorganic hybrid nanoporous material may be regenerated by desorbing 50% or more of the total adsorption amount of adsorbed water at 100° C. or lower.

The first organic-inorganic hybrid nanoporous material may adsorb 50% or more of the total adsorption amount of water at a relative humidity p/p0 ranging from 0.3 to 0.6.

In one embodiment, the first organic-inorganic hybrid nanoporous material may be an organic-inorganic hybrid nanoporous material having 0.5 mol to 3 mol of a hydrophilic hydroxyl group (OH) or a hydroxide anion ($OH^-$) group as a ligand per 1 mol of a central metal ion in a nanopore. The first organic-inorganic hybrid nanoporous material has a water adsorption capacity of 0.15 gram or more per 1 gram or 1 milliliter thereof. Specifically, representative examples of the first organic-inorganic hybrid nanoporous material may include aluminum fumarate, zirconium fumarate, CAU-10, MIL-160, MIL-53, UiO-66, analogs thereof, etc.

Since the first organic-inorganic hybrid nanoporous material having a hydrophilic OH ligand, which is weaker than the coordinatively unsaturated metal site in the framework, exhibits a not very strong interaction with polar molecules such as water, the first organic-inorganic hybrid nanoporous material may be not only effective as a water adsorbent, but also regenerated by desorbing water at a low temperature.

In the first organic-inorganic hybrid nanoporous material, when the content of the hydrophilic hydroxyl group (OH) or the hydroxide anion (OH⁻) group is less than 0.5 mol per 1 mol of the central metal ion, hydrophilicity may be weak, and therefore, the water adsorption amount at a low relative humidity may be not high, and when the content is more than 3 mol per 1 mol of the central metal ion, hydrophilicity may be too strong, and therefore, water desorption may not easily occur to increase a regeneration temperature.

The first organic-inorganic hybrid nanoporous material is preferably a material which does not react with the electrolyte and the electrode active material and does not deteriorate performances of the battery particularly, in the first organic-inorganic hybrid nanoporous material, the central metal ion is preferably a central metal ion that does not electrochemically react in the secondary battery. For example, the central metal ion is preferably a central metal ion that is free of sites for reaction/adsorption with lithium ions because of having no unshared electron pairs.

Further, the first organic-inorganic hybrid nanoporous material according to the present invention preferably has a center metal ion which does not significantly lower the lithium ion mobility, thereby suppressing the decrease of conductivity and the deterioration of battery performance. Therefore, in the first organic-inorganic hybrid nanoporous material according to the present invention, the central metal ion is preferably not a transition metal, because the transition metal may react with or encapsulate lithium ions.

In terms of the water adsorption amount of the first organic-inorganic hybrid nanoporous material, the ligand is not critical and the central metal ion is preferably one or more selected from the group consisting of aluminum ion, calcium ion, gallium ion, indium ion, magnesium ion, and zirconium ion.

The size of the nanopore of the first organic-inorganic hybrid nanoporous material may be controlled by adjusting the length and/or type of the ligand.

The first organic-inorganic hybrid nanoporous material according to the present invention may have heterocyclic dicarboxylic acid anion as the ligand. Preferably, the ligand may be one or more selected from the group consisting of a terephthalic acid anion, a furan dicarboxylic acid anion, a pyridine dicarboxylic acid anion, a benzenetricarboxylic acid, a thiophene dicarboxylic acid anion, and a pyrazole dicarboxylic acid anion.

Further, the secondary battery according to the present invention may further include a second organic-inorganic hybrid nanoporous material, of which water adsorption capacity is higher than water desorption capacity at a relative humidity p/p0 of 0.3 or less (herein, p0 represents a saturated vapor pressure at an application temperature and p represents a vapor pressure upon adsorption).

As used herein, the term "second organic-inorganic hybrid nanoporous material" may refer to, as described above, an organic-inorganic hybrid nanoporous material of which water adsorption capacity is higher than water desorption capacity at a relative humidity p/p0 of 0.3 or less.

In one embodiment, the second organic-inorganic hybrid nanoporous material may be an organic-inorganic hybrid nanoporous material having a coordinatively unsaturated metal site present in the framework, surface, or nanopore.

In the present invention, the usable second organic-inorganic hybrid nanoporous material is not limited to the kind thereof, as long as it has a coordinatively unsaturated metal site (CUS). The coordinatively unsaturated metal site may be formed in the framework, or formed on the surface of the second organic-inorganic hybrid nanoporous material or in a metal ion or an organic metal compound present in the nanopore. The coordinatively unsaturated metal site refers to a position as a site for the coordination of metals where a ligand coordinated by the metal ions of the organic-inorganic hybrid nanoporous material, representatively water, an organic solvent, etc., are removed, in which another ligand may form a coordination again. The coordinatively unsaturated metal site may be formed by partial or entire removal of water, solvent molecules other than water, or ligands, which are contained in the organic-inorganic hybrid nanoporous material. In order to secure the coordinatively unsaturated metal site of the organic-inorganic hybrid nanoporous material, a pretreatment of removing water or solvent components bound to the coordinatively unsaturated metal site may be preferably performed. As a method for the pretreatment, any method that may remove water or solvent components may be used as long as it does not induce a modification of the organic-inorganic hybrid nanoporous material. For example, the pretreatment may be achieved by heating at a temperature of 100° C. or higher, preferably 150° C. or higher under reduced pressure, but is not limited thereto. Alternatively, solvent-removing methods known in the art, such as vacuum treatment, solvent exchange, sonication, etc., may be used without limitation. Representative examples of the second organic-inorganic hybrid nanoporous material, of which the coordinatively unsaturated metal site may be secured by the heat treatment, may include MIL-100, MIL-101, MOF-74, Cu-BTC, MIL-127, CPO-27, etc.

Preferably, the second organic-inorganic hybrid nanoporous material may have the coordinatively unsaturated metal site with a density of 0.2 mmol/g to 10 mmol/g. If the density of the coordinatively unsaturated metal site of the second organic-inorganic hybrid nanoporous material is less than 0.2 mmol/g, its nitrogen adsorption capacity is low although having adsorption selectivity for nitrogen, and thus efficiency of a process of separating nitrogen-containing gas is reduced. In contrast, if the density of the coordinatively unsaturated metal site of the second organic-inorganic hybrid nanoporous material is more than 10 mmol/g, there is a structural difficulty in the formation of the organic-inorganic hybrid nanoporous material and the density is difficult to achieve experimentally.

The second organic-inorganic hybrid nanoporous material may include one or more metal ions selected from the group consisting of chromium ion, iron ion, nickel ion, cobalt ion, molybdenum ion, manganese ion, copper ion, magnesium ion, zinc ion, and zirconium ion as the central metal ion.

The second organic-inorganic hybrid nanoporous material may be prepared by using an organic ligand constituting the general organic-inorganic hybrid nanoporous material without limitation. For example, one or more of 1,4-benzenedicarboxylic acid (BDCA), isophthalic acid, 1,3,5-benzenetricarboxylic acid (BTCA), 2,5-dihydroxyterephthalic acid (or 2,5-dihydroxy-1,4-benzene dicarboxylic acid), 2-aminoterephthalic acid, 2-nitroterephthalic acid, 2-methylterephthalic acid, 2-haloterephthalic acid, azobenzene tetracarboxylic acid, 1,3,5-tri(4-carboxyphenyl)benzene, 2,6-naphthalene dicarboxylic acid (NDCA), benzene-1,3,5-tribenzoic acid (BTB), fumaric acid, glutaric acid, 2,5-furanedicarboxylic acid (FDCA), 1,4-pyridine dicarboxylic acid, 2-methylimidazole, alkyl-substituted imidazole, aromatic ring-substituted imidazole, 2,5-pyrazinedicarboxylic acid, 1,4-benzene dipyrazole, 3,5-dimethyl-pyrazolate-4-carboxylate, 4-(3,5-dimethyl-1H-pyrazol-4-yl)benzoate, 1,4-(4-bispyrazolyl) benzene, and derivatives thereof may be used. Preferably, 1,4-benzenedicarboxylic acid, 1,3,5-benzenetricarboxylic acid, 2,5-dihydroxyterephthalic acid, 2,6-naphthalenedicarboxylic acid, azobenzene tetracarboxylic acid, or derivatives thereof may be used, but is not limited thereto.

Meanwhile, when $LiPF_6$ lithium salts are included in the electrolyte, $LiPF_6$ should exist in the form of $Li^+$ and $PF_6^-$ ions. However, without intention, a side reaction occurs, and as a result, $PF_5$ is produced as a by-product, and reacts with $H_2O$ which is present in a small amount in the electrolyte to generate HF. HF destroys SEI layer and causes dissolution of a cathode. This phenomenon occurs more remarkably at a high temperature. According to the kind of the lithium salt used as the electrolyte, materials such as HF, HCl, HBr, HI, etc. are produced, in addition to HF, and they act as an acid like HF to generate the problem. Therefore, it is necessary to prevent generation of acids such as HF, etc. by adding the water adsorbent.

The first organic-inorganic hybrid nanoporous material or second organic-inorganic hybrid nanoporous material according to the present invention may adsorb not only water but also carbon dioxide and/or HF. In particular, when amino groups are present in the first organic-inorganic hybrid nanoporous material or second organic-inorganic hybrid nanoporous material, they may also adsorb HF or $CO_2$.

In general, water present inside the battery is electrochemically decomposed, causing a problem of a resistance increase in the battery, and also has a great influence on decomposition of electrolyte. To remove these influences, preparation of electrode materials and electrolytes are carried out under a water-controlled environment. Since the electrolyte is prepared in a closed system, it is possible to control the content of water at a predetermined level. However, the electrode materials show different water adsorption properties due to an increase of specific surface area and a difference in water affinity depending on the material.

The secondary battery having the first organic-inorganic hybrid nanoporous material, and optionally, the second organic-inorganic hybrid nanoporous material according to the present invention as the water adsorbent may have a battery case which accommodates an electrode assembly including a cathode, an anode, and a separator disposed between the cathode and the anode, together with an electrolyte, but is not limited thereto. In this regard, the organic-inorganic hybrid nanoporous material according to the present invention may be included in one or more selected from the group consisting of the cathode, the anode, the separator, the electrolyte, and the interior of the battery case, but is not limited thereto.

As described above, in a preferred embodiment, a method of manufacturing the secondary battery according to the present invention may include the step of adsorbing water during manufacturing of the battery and desorbing water during assembling of the battery by using the first organic-inorganic hybrid nanoporous material which may be regenerated by desorbing 70%, or more, preferably 80% or more of the total adsorption amount of adsorbed water at 150° C. or lower.

Further, the method of manufacturing the secondary battery according to the present invention may further include the step of disposing the second organic-inorganic hybrid nanoporous material, of which water adsorption capacity is higher than water desorption capacity at a relative humidity p/p0 of 0.3 or less, in the position where water generated during operation of the battery is adsorbed.

Preferably, the first organic-inorganic hybrid nanoporous material may be disposed in the position where water is adsorbed and desorbed during manufacturing of the battery, and the second organic-inorganic hybrid nanoporous material may be disposed in the position where water generated during operation of the battery is adsorbed.

Specifically, the second organic-inorganic hybrid nanoporous material may be positioned inside the electrode active material, on the surface of the separator, or inside the electrolyte, together with the first organic-inorganic hybrid nanoporous material.

When the first organic-inorganic hybrid nanoporous material, and optionally, the second organic-inorganic hybrid nanoporous material according to the present invention as the water adsorbents are applied to the secondary battery, the first organic-inorganic hybrid nanoporous material and the second organic-inorganic hybrid nanoporous material according to the present invention may be added to the electrolyte or electrode active material composition in an amount of 1~10% by weight, preferably in an amount capable of adsorbing water of 1000 ppm or less, and more preferably, in an amount capable of adsorbing water of 500 ppm or less, respectively. Further, as described above, the first organic-inorganic hybrid nanoporous material, and optionally, the second organic-inorganic hybrid nanoporous material may be disposed in the cathode, the anode, the separator, and/or the internal surface of the battery case, or may be included by supporting or coating the materials on a polymer sheet.

The first organic-inorganic hybrid nanoporous material, and optionally, the second organic-inorganic hybrid nanoporous material according to the present invention may be coated or deposited on the surface. A thickness of the coating layer may be 0.1 micrometer or more to 8.0 micrometer or less. Out of the above range, if the thickness of the coating layer is less than 0.1 micrometer, the desired swelling-preventing effect may not be achieved, and if the thickness of the coating layer is more than 0.8 micrometer, a flow of ions may be disturbed, which is undesirable.

The secondary battery according to the present invention may be a pouch-type battery having an electrode assembly which is mounted in a pouch-type case made of a laminate sheet including a metal layer and a resin layer.

The battery case may be constituted by a laminate sheet consisting of an outer cover layer as a polymer film, a barrier layer as a metal film, and a polyolefin-based inner sealant layer. The polymer sheet to which the first organic-inorganic hybrid nanoporous material, and optionally, the second organic-inorganic hybrid nanoporous material according to the present invention are supported may be simply inserted into the corresponding region between the batter case and the electrode assembly during assembling of the battery, or may be attached to the corresponding region of the battery case. In the latter case, the polymer sheet may be attached by using a non-reactive adhesive which does not influence operation of the battery or by thermal fusion. The non-reactive adhesive may be a silicone polymer adhesive or a carbon optical fiber polymer adhesive.

The polymer sheet may be in the form of a non-woven fabric, and a material of the polymer sheet may be PE (polyethylene), PP (polypropylene), PS (polystyrene), PVdF (polyvinylidene fluoride), PTFE (polytetrafluoroethylene), PET (polyethylene-terephthalate). PMMA (polymethylmethacrylate), and/or PAN (polyacrylonitrile).

A method of applying the first organic-inorganic hybrid nanoporous material, and optionally, the second organic-inorganic hybrid nanoporous material according to the present invention to the polymer sheet is not particularly limited, and for example, the first organic-inorganic hybrid nanoporous material, and optionally, the second organic-inorganic hybrid nanoporous material may be supported in the polymer sheet by a method of immerging the polymer sheet in a solution in which the first organic-inorganic hybrid nanoporous material, and optionally, the second organic-inorganic hybrid nanoporous material are dispersed, or they may be coated on the surface of the polymer sheet by various methods such as flow coating, spin coating, dip coating, bar coating, etc., or the organic-inorganic hybrid nanoporous materials may be deposited on the surface of the polymer sheet by vaporizing the organic-inorganic hybrid nanoporous materials.

A particle size and a particle distribution of the first organic-inorganic hybrid nanoporous material, and optionally, the second organic-inorganic hybrid nanoporous material according to the present invention are not particularly limited, as long as they may exhibit the desired water adsorption function and may not influence performances of the battery. The particle size and the particle distribution may be determined by considering their amounts to be loaded on the surface of the electrode assembly or in the battery case, a volume of the battery, etc. The particle size of the first organic-inorganic hybrid nanoporous material, and optionally, the second organic-inorganic hybrid nanoporous material according to the present invention may be, for example, 0.001 μm to 200 μm to avoid clogging of separator pores without unnecessarily increasing the volume of the battery.

When the first organic-inorganic hybrid nanoporous material, and optionally, the second organic-inorganic hybrid nanoporous material according to the present invention are disposed as a coating layer on a part or all of the outer surface of the electrode assembly, they may be dispersed in an organic solvent, together with a binder, to form a slurry, which may be coated on a part or all of the outer surface of the electrode assembly. In this regard, the coating method is not particularly limited, as long as it is a coating method commonly used in the art. For example, a spray coating method may be used.

The binder polymer may be, for example, one or more selected from the group consisting of polyethylene oxide, polyvinylidene fluoride, polyvinylidene fluoride-hexafluoropropylene, polyvinylidene fluoride-trichlorethylene, polymethyl methacrylate, polyacrylonitrile, polyacrylonitrile-styrene copolymer, polyvinyl chloride (PVC), polyvinyl pyrrolidone, polyvinyl acetate, a polyethylene vinyl acetate copolymer, gelatin, cyanoethylpullulan, cyanoethylpolyvinyl alcohol, cyanoethylcellulose, cyanoethyl sucrose, pullulan, cellulose acetate, cellulose acetate butyrate, cellulose acetate propionate, polyethylene glycol, glyme, polyethylene glycol dimethyl ether, and carboxymethyl cellulose, but is not limited thereto.

When the first organic-inorganic hybrid nanoporous material, and optionally, the second organic-inorganic hybrid nanoporous material according to the present invention are supported on a predetermined structure, the structure should be composed of a material which is unreactive with the electrolyte to accommodate the first organic-inorganic hybrid nanoporous material, and optionally, the second organic-inorganic hybrid nanoporous material. For example, the structure may be in the form of a bag prepared by using a polyolefin-based non-woven fabric, and after accommodating the organic-inorganic hybrid nanoporous materials, the bag may be sealed by a common method in the art, such as heat seal. The prepared structure including the first organic-inorganic hybrid nanoporous material, and optionally, the second organic-inorganic hybrid nanoporous material may be disposed in a desired position in the battery.

The position of the first organic-inorganic hybrid nanoporous material, and optionally, the second organic-inorganic hybrid nanoporous material according to the present invention in the battery is not particularly limited, as long as they are able to adsorb water in the electrolyte in that position. For example, the structure supporting the first organic-inorganic hybrid nanoporous material, and optionally, the second organic-inorganic hybrid nanoporous material may be disposed in upper and lower ends of a jelly-roll type electrode assembly in which the cathode, the separator, and the anode are wound, or in the cross-section of a folded battery in which the cathode, the separator, and the anode are folded, or the first organic-inorganic hybrid nanoporous material, and optionally, the second organic-inorganic hybrid nanoporous material may be applied to the outer surface of the jelly-roll type electrode assembly, to the outer surface of the folded battery, or inside the battery case by a coating method.

The first organic-inorganic hybrid nanoporous material, and optionally, the second organic-inorganic hybrid nanoporous material according to the present invention may constitute the laminate material itself constituting the battery case or the electrode assembly.

Generally, in a lithium secondary battery, an electrode assembly of a cathode/separator/anode structure is mounted in a battery case. For example, the lithium secondary battery consists of the cathode, anode, separator, and lithium salt-containing non-aqueous electrolyte, etc.

The cathode is prepared, for example, by applying and drying a mixture of a cathode active material, a conductive material, and a binder on a cathode current collector. As desired, the mixture may further include a filler. The anode is also prepared by applying and drying a anode material on a anode current collector. As desired, the above-described components may be further included.

The cathode active material may include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_2O_4$ (wherein x is 0~0.33), $LiMnO_3$, $LiMn_2O_3$. $LiMnO_2$, etc.; lithium copper oxide ($Li_2CuO_2$); vanadium oxides such as $LiV_3O_8$, $LiFe_3O_4$, $V_2O_5$, $Cu_2V_2O_7$, etc.; Ni-site type lithium nickel oxides represented by Formula $LiNi_{1-x}M_xO_2$ (wherein M=Co, Mn, Al, Cu, Fe, Mg, B or Ga, x=0.01~0.3); lithium manganese composite oxides represented by Formula $LiMn_{2-x}M_xO_2$ (wherein M=Co, Ni, Fe, Cr, Zn or Ta, x=0.01~0.1) or $Li_2Mn_3MO_8$ (wherein M=Fe, Co, Ni, Cu or Zn); $LiMn_2O_4$ where some of the Li atoms are substituted with alkaline earth metal ions; disulfide compounds; $Fe_2(MoO_4)_3$, etc., but is not limited thereto.

The anode active material may include, for example, carbon and graphite materials, such as natural graphite, artificial graphite, expanded graphite, carbon fiber, hard graphitizable carbon, carbon black, carbon nanotube, fullerene, activated carbon, etc.; metals, such as Al, Si, Sn, Ag, Bi, Mg, Zn, In, Ge, Pb, Pd, Pt, Ti which may be alloyed with lithium, and a compound containing these elements; a complex of a metal and a compound thereof and carbon and graphite materials; lithium-containing nitrides, etc. Among them, a carbon-based active material, a silicon-based active material, a tin-based active material, or a silicon-carbon-based active material is more preferred. These materials may be used alone or in combination of two or more thereof.

The separator generally has a pore diameter of 0.01 µm to 10 µm and a thickness of 5 µm to 300 µm. As the separator, sheets or non-woven fabrics made of an olefin polymer such as polypropylene, glass fibers, or polyethylene, which have chemical resistance and hydrophobicity, are used. When a solid electrolyte such as a polymer is employed as the electrolyte, the solid electrolyte may also serve as the separator.

Examples of the binder may include polyvinyl alcohol, carboxymethylcellulose (CMC), starch, hydroxypropylcellulose, regenerated cellulose, tetrafluoroethylene, polyethylene, polypropylene, ethylene-propylene-diene terpolymer (EPDM), sulfonated EPDM, styrene-butadiene rubber, fluorine rubber, various copolymers, high molecular weight polyvinyl alcohol with high degree of hydrolysis, in addition to those described above.

The conductive material is a component to further improve conductivity of the electrode active material, and may be added in an amount of 1% by weight to 30% by weight based on a total weight of the electrode mixture. The conductive material is not particularly limited as long as it has conductive properties without causing chemical changes in the battery. The conductive material may include, for example, graphite such as natural graphite or artificial graphite; carbon black such as carbon black, acetylene black, ketchen black, channel black, furnace black, lamp black, summer black, etc, carbon derivatives such as carbon nanotubes, fullerene, etc., conductive fibers such as carbon fiber, metal fiber, etc.; metal powder such as carbon fluoride, aluminum, nickel powder, etc; conductive whiskers such as zinc oxide, potassium titanate, etc.; conductive metal oxides such as titanium oxide, etc.; conductive substances such as polyphenylene derivatives, etc.

A viscosity modifier is a component to adjust the viscosity of the electrode mixture so as to facilitate a mixing process of the electrode mixture and a coating process on a current collector, and may be added in an amount of 30% by weight based on the total weight of the electrode mixture. Examples of the viscosity modifier include carboxymethylcellulose, polyvinylidene fluoride, etc., but are not limited thereto. In some cases, the above-described solvent may also act as the viscosity modifier.

A filler is an auxiliary component to inhibit electrode expansion. The filler is not particularly limited as long as it is a fibrous material that does not cause chemical changes in the battery, and for example, olefin-based polymers such as polyethylene, polypropylene, etc.; and fibrous materials such as glass fiber, carbon fiber, etc. may be used.

A coupling agent is an auxiliary component to increase adhesive strength between the electrode active material and the binder, and is characterized by having two or more functional groups. The coupling agent may be added in an amount of up to 30% by weight, based on the weight of the binder. The coupling agent may be, for example, a material in which one functional group forms a chemical bond via reaction with a hydroxyl or carboxyl group present on the surface of the silicon-, tin- or graphite-based active material, and the other functional group forms a chemical bond via reaction with the polymer binder. Specific examples of the coupling agent may include silane-based coupling agents such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane, cyanatopropyl triethoxysilane, etc., but are not limited thereto.

An adhesive accelerator is an auxiliary component to improve adhesive strength of the active material to the current collector, and may be added in an amount of 10% by weight or less, based on the weight of the binder. Examples of the adhesive accelerator may include oxalic acid, adipic acid, formic acid, acrylic acid derivatives, itaconic acid derivatives, etc.

A molecular weight regulator may be t-dodecylmercaptan, n-dodecylmercaptan, n-octylmercaptan, etc., and a crosslinking agent may be 1,3-butanediol diacrylate, 1,3-butanediol dimethacrylate, 1,4-butanediol diacrylate, 1,4-butanediol dimethacrylate, aryl acrylate, aryl methacrylate, trimethylol propane triacrylate, tetraethylene glycol diacrylate, tetraethylene glycol dimethacrylate, divinyl benzene, etc.

In the electrode, the current collector is a site where migration of electrons takes place in the electrochemical reaction of the active material, and includes a anode current collector and a cathode current collector according to the kind of the electrode. The anode current collector is generally fabricated in a thickness of 3 µm to 500 µm. The anode current collector is not particularly limited, as long as it has conductivity without causing chemical changes in the battery. For example, copper, stainless steel, aluminum, nickel, titanium, sintered carbon, copper or stainless steel having a surface treated with carbon, nickel, titanium or silver, aluminum-cadmium alloys, etc. may be used.

The cathode current collector is generally fabricated in a thickness of 3 µm to 500 µm. The cathode current collector is not particularly limited, as long as it has high conductivity without causing chemical changes in the battery. For example, stainless steel, aluminum, nickel, titanium, sintered carbon, aluminum or stainless steel having a surface treated with carbon, nickel, titanium or silver, etc. may be used.

These current collectors may also be processed to form fine irregularities on the surfaces thereof so as to enhance adhesive strength to the electrode active materials. The current collectors may be used in various forms including films, sheets, foils, nets, porous structures, foams, non-woven fabrics, etc.

The lithium-containing non-aqueous electrolyte is composed of a non-aqueous electrolyte and lithium salt.

As the non-aqueous electrolyte, for example, non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc. may be used.

The lithium salt is a material that is readily soluble in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlC_4$, $CH_3SO_3Li$, $CF_3SO_3Li$, $(CF_3SO_2)_2NLi$, chloroborane lithium, lower aliphatic carboxylic acid lithium, lithium tetraphenyl borate, imide, etc. may be used.

If necessary, an organic solid electrolyte, an inorganic solid electrolyte, etc. may be used.

The organic solid electrolyte may include, for example, polyethylene derivatives, polyethylene oxide derivatives, polypropylene oxide derivatives, phosphoric acid ester polymer, poly agitation lysine, polyester sulfide, polyvinyl alcohol, poly(vinylidene fluoride), and polymers containing ionic dissociation groups, etc.

The inorganic solid electrolyte may include, for example, nitrides, halides, and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, the non-aqueous electrolyte may further include halogen-containing solvents such as carbon tetrachloride, ethylene trifluoride, etc. in order to impart incombustibility, and may further include carbon dioxide gas in order to improve high-temperature storage characteristics.

The lithium secondary battery according to the present invention may be manufactured by a common method known in the art. In the lithium secondary battery according to the present invention, the structures of the cathode, the anode, and the separator are not particularly limited, and for example, the lithium secondary battery has a structure in which respective sheets may be inserted into a cylindrical, rectangular, or pouch case in a winding type or a folding or stacking type.

The lithium secondary battery according to the present invention may be preferably used as a high-power large-scale battery or a unit battery for a battery pack. The battery pack may be particularly used as a power source for vehicles such as electric vehicles requiring excellent high-temperature storage characteristics, hybrid electric vehicles, power tool plug-in hybrid electric vehicles, power storage devices, etc.

Hereinafter, the present invention will be described in more detail with reference to Examples. However, these Examples are for illustrative purposes only, and the scope of the present invention is not intended to be limited by these Examples.

Example 1: Synthesis and Adsorption Property of Aluminum 2,5-Furanedicarboxylate (Al(OH)BDC) Material An organic-inorganic hybrid nanoporous material, aluminum 2,5-furanedicarboxylate (Al(OH)BDC) was synthesized as follows. 13.8 mmol of isophthalic acid was dissolved in DMF to prepare a first solution, and 1 M $Al_2(SO_4)_3 \cdot 8H_2O$ aqueous solution was added to 36.8 ml of double distilled water to prepare a second solution so that the mole number of $Al_2(SO_4)_3 \cdot 8H_2O$ was 13.8 mmol. The synthesized solution mixture was transferred to a 100 ml Taflon-autoclave reactor and reacted at 100° C. for 12 hours.

Figure 2:
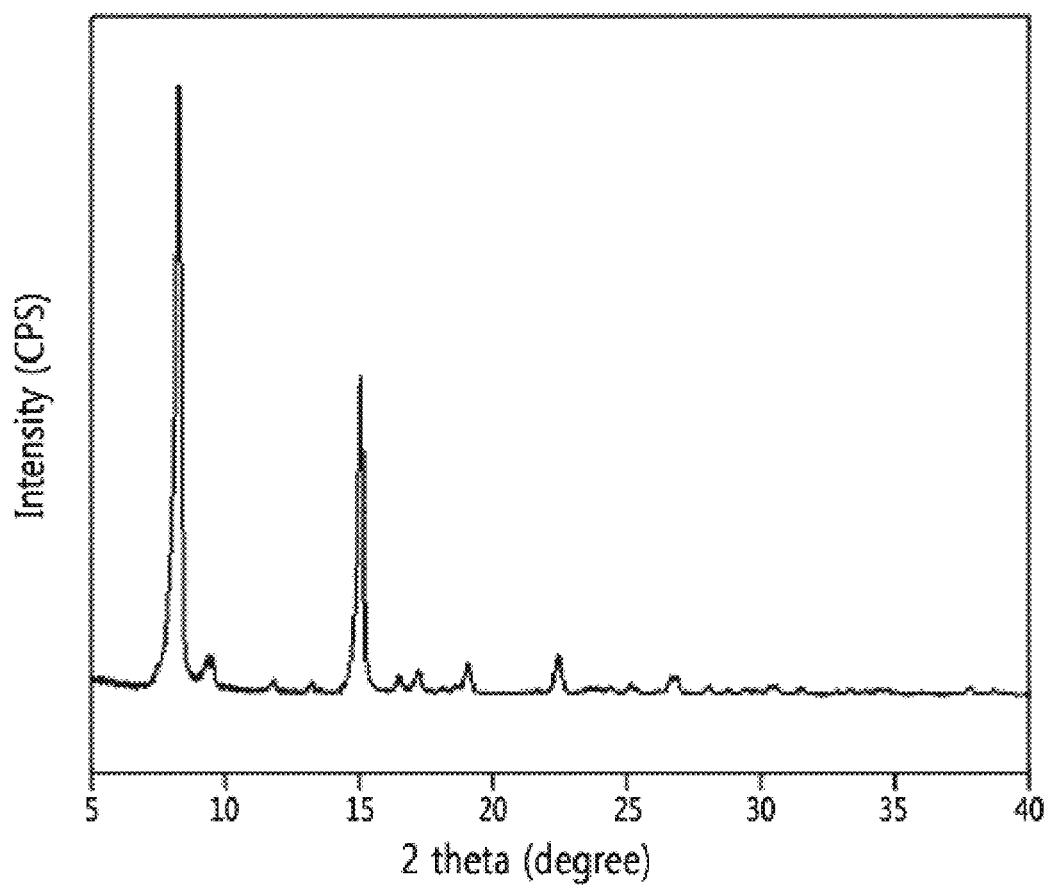
FIG. 2 shows result of X-ray diffraction analysis of Al(OH)BDC organic-inorganic hybrid nanoporous material.

The organic-inorganic hybrid nanoporous materials are known to have different structures and material compositions depending on coordination and bond formation, even though they are composed of the same metal ions and organic ligands. FIG. 2 shows X-ray diffraction pattern and X-ray pattern measured by using synthesized Al(OH)BDC powder. The crystal system of Al(OH)BDC obtained by X-ray diffraction analysis was calculated to have a tetragonal space group of $I4_1md$, a lattice length of a=b axis of 21.55(7) Å and c axis of 10.38(3) Å, and a lattice volume of 4820.49 Å$^3$. Further, Al(OH)BDC has Chemical Formula of $[Al(OH)[(O_2C)-C_6H_4-(CO_2)]\cdot n$ (solvent) (wherein the solvent is $H_2O$, and n is a real number ranging from 0.1 to 10), and Al(OH)BDC after being dried at 150° C. or higher has Chemical Formula of $[Al(OH)[(O_2C)-C_6H_4-(CO_2)]$, and it was calculated that dried Al(OH)BDC has a molecular weight of about 204 g/mol.

The framework structure of Al(OH)BDC may be built from inorganic aluminum chains linked via carboxylate groups from the ligands, and the chains may be described as $AlO_6$ octahedra cis-connected by corner. Each octahedra is surrounded by four oxygen atoms derived from four carboxylate ligands and oxygen atoms derived from two OH groups. The two OH$^-$ ion groups linked to Al of $AlO_6$ octahedra are in cis-position and bridge the Al centers to create the chains. As shown in FIG. 1, the nanopore structure of Al(OH)BDC forms square-shaped sinusoidal channels having a diameter of about 7 Å.

Figure 4:
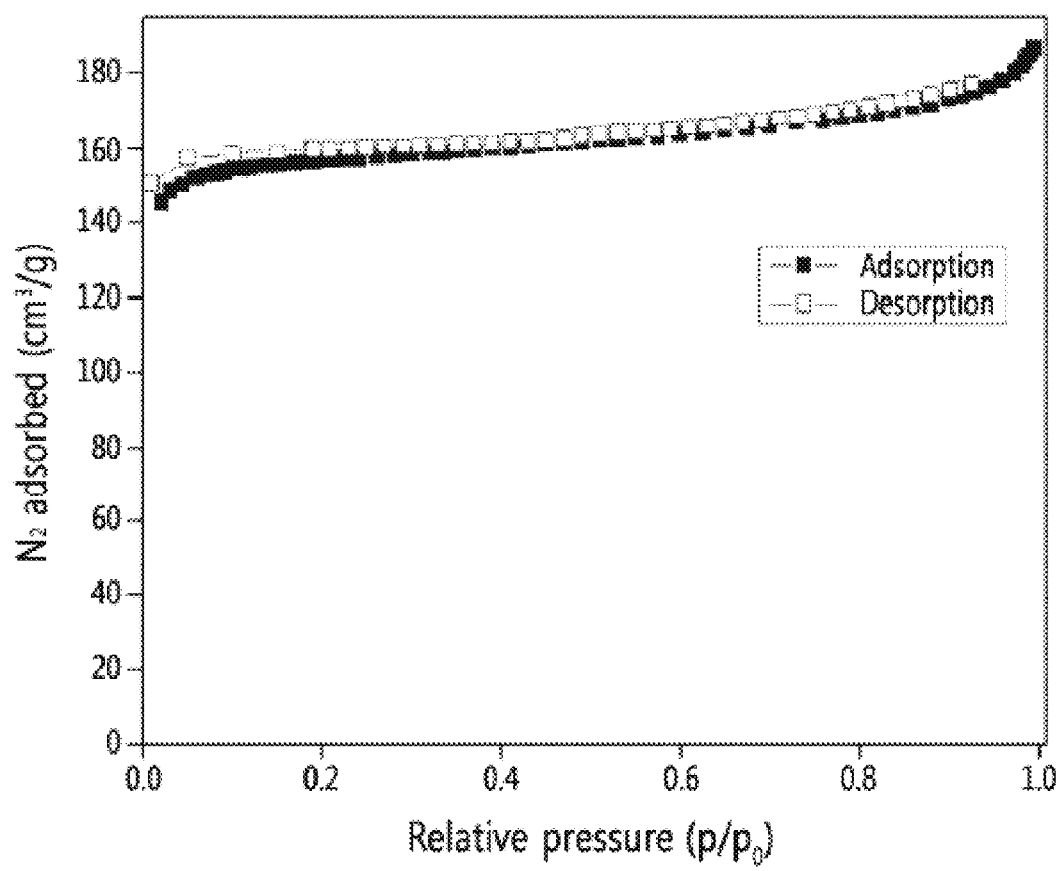
FIG. 4 shows a nitrogen physical adsorption isotherm for Al(OH)BDC organic-inorganic hybrid nanoporous material, which was measured at a liquid nitrogen temperature (−195° C.)

To measure a specific surface area and a nanopore volume of the Al(OH)BDC material obtained by the synthesis, a TriStar volume adsorption device manufactured by Micrometrics was used to perform a nitrogen physical adsorption experiment at −196° C., and shown in FIG. 4. In this regard, the Al(OH)BDC material was dried at a vacuum level of 10$^{-4}$ Torr or higher and a pretreatment temperature of 150° C. for 6 hours, and then a nitrogen adsorption amount was measured. A physical adsorption isotherm of nitrogen thus obtained showed Type-I isotherm as in nanoporous zeolite, and a calculated BET surface area and a nanopore volume were 650 m$^2$/g and 0.27 cm$^3$/g, respectively.

Figure 3:
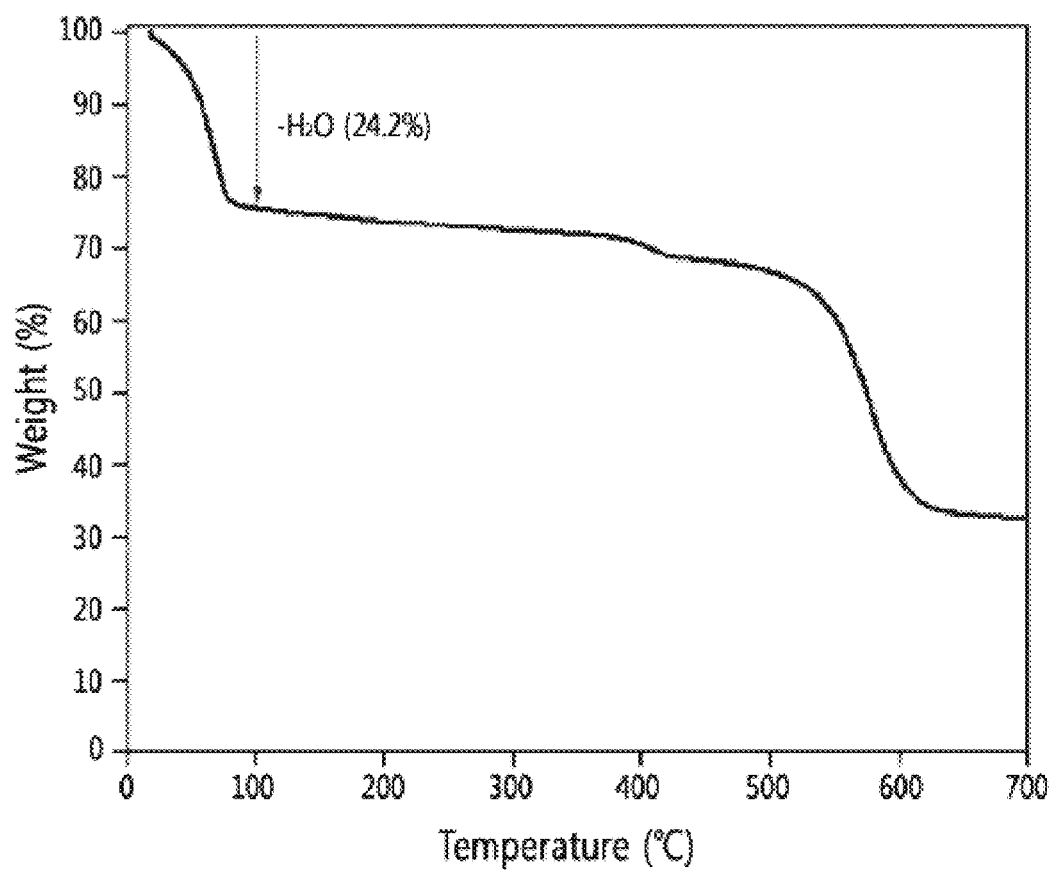
FIG. 3 shows a thermogravimetric analysis graph of Al(OH)BDC sample, which was measured from room temperature to 700° C. at a heating rate of 5° C. per minute under nitrogen atmosphere.
Figure 5:
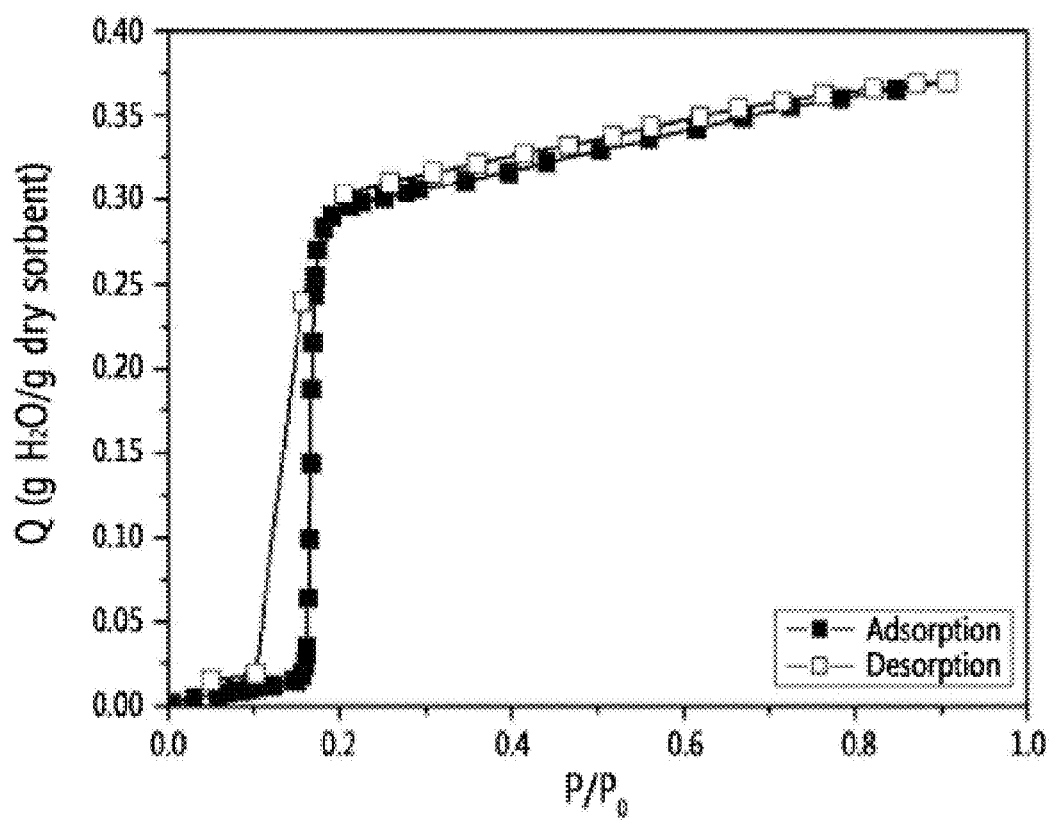
FIG. 5 shows a water adsorption/desorption isotherm for Al(OH)BDC, which was measured at 30° C.

A water adsorption property of the Al(OH)BDC material was measured by using an IGA gravimetric adsorption analyzer manufactured by Hiden. In this regard, for pretreatment, the Al(OH)BDC material was dried at a vacuum level of 10$^{-5}$ Torr and a temperature of 150° C. for 6 hours, and then temperature was decreased to 30° C. to measure adsorption and desorption isotherms at a ratio of water vapor pressure to saturated vapor pressure (p/p0) ranging from 0~1.0. The water adsorption/desorption isotherms of Al(OH)BDC as shown in FIG. 5 has a characteristic of having S-shaped reversible isotherm in an almost saturated form at p/p0>0.20. In this range, Al(OH)BDC showed a high adsorption amount close to 0.30 g per 1 g. An excessively hydrophilic aluminosilicate zeolite, represented by NaX zeolite, shows Type-I water adsorption isotherm under condition of p/p0<0.05, which makes desorption difficult. Therefore, a desorption temperature of 150° C. or higher is generally required. In contrast, a thermogravimetric analysis of FIG. 3 confirmed that 24% by weight of the Al(OH)BDC material saturated with water was dehydrated at a low temperature of 90° C. or lower. The Al—OH groups in the framework of Al(OH)BDC increase hydrophilicity of the organic-inorganic hybrid nanoporous material and also interact with water molecules in an appropriate strength, and therefore, the Al(OH)BDC material is regenerable at a much lower temperature, compared to zeolite.

Example 2: Synthesis and Characterization of Aluminum Fumarate (Al-Fumarate) Material An organic-inorganic hybrid Al-Fumarate was synthesized as follows. 70 ml of water ($H_2O$) was put in a beaker, and 15.06 g of aluminum sulfate salt hydrate ($Al_2(SO_4)$ ₃.18H₂O) was added thereto to prepare a first solution. 70 ml of water (1H₂O) was put in a beaker, and 5.2 g of fumaric acid and 5.3 g of sodium hydroxide (NaOH) were added thereto to prepare a second solution. After the solutions were completely dissolved, the second solution was slowly added to the first solution and stirred for 30 minutes while maintaining the two solutions at 60° C.

To remove residual unreacted materials, the solution was filtered and then dispersed in 500 ml of water at 80° C., and stirred and filtered. Lastly, a nanoporous material produced after stirring at 70° C. for 3 hours was filtered and recovered by using 500 ml of ethanol, and then dried at 100° C. for 12 hours.

Figure 6:
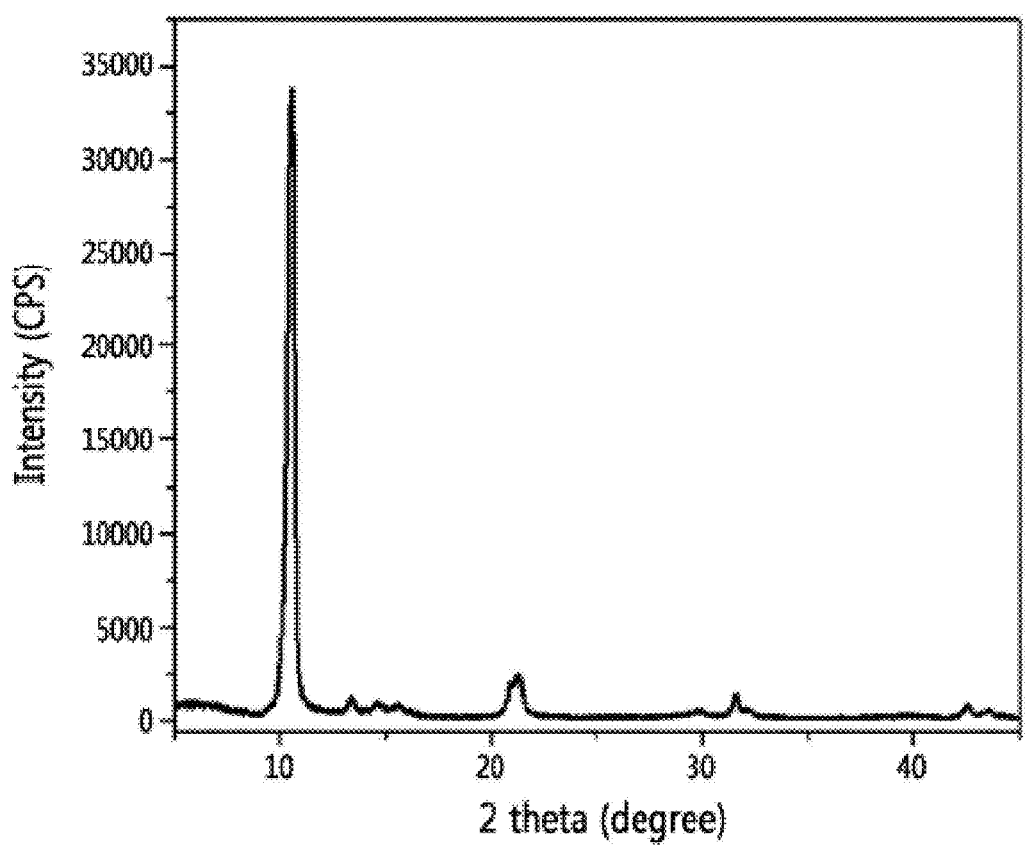
FIG. 6 shows result of X-ray diffraction analysis of Al-Fumarate organic-inorganic hybrid nanoporous material.

Al-Fumarate after the synthesis has Chemical Formula of [Al(OH)[(O₂C)—C₂H₂—(CO₂)].n (solvent) (wherein the solvent is H₂O), and Al-Fumarate after being dried at 100° C. has Chemical Formula of [Al(OH)[(O₂C)—C₂H₂—(CO₂)]. With regard to a structure of Al-Fumarate calculated by X-ray diffraction analysis, as shown in FIG. 6. Al-Fumarate was confirmed to crystallize in a monoclinic space group P2₁/C with nanopore channels having a diameter of about ~5.8 Å and cell parameters of a=6.842(3) Å, b=12.088 (12) Å, and c=14.207(1) Å.

Figure 7:
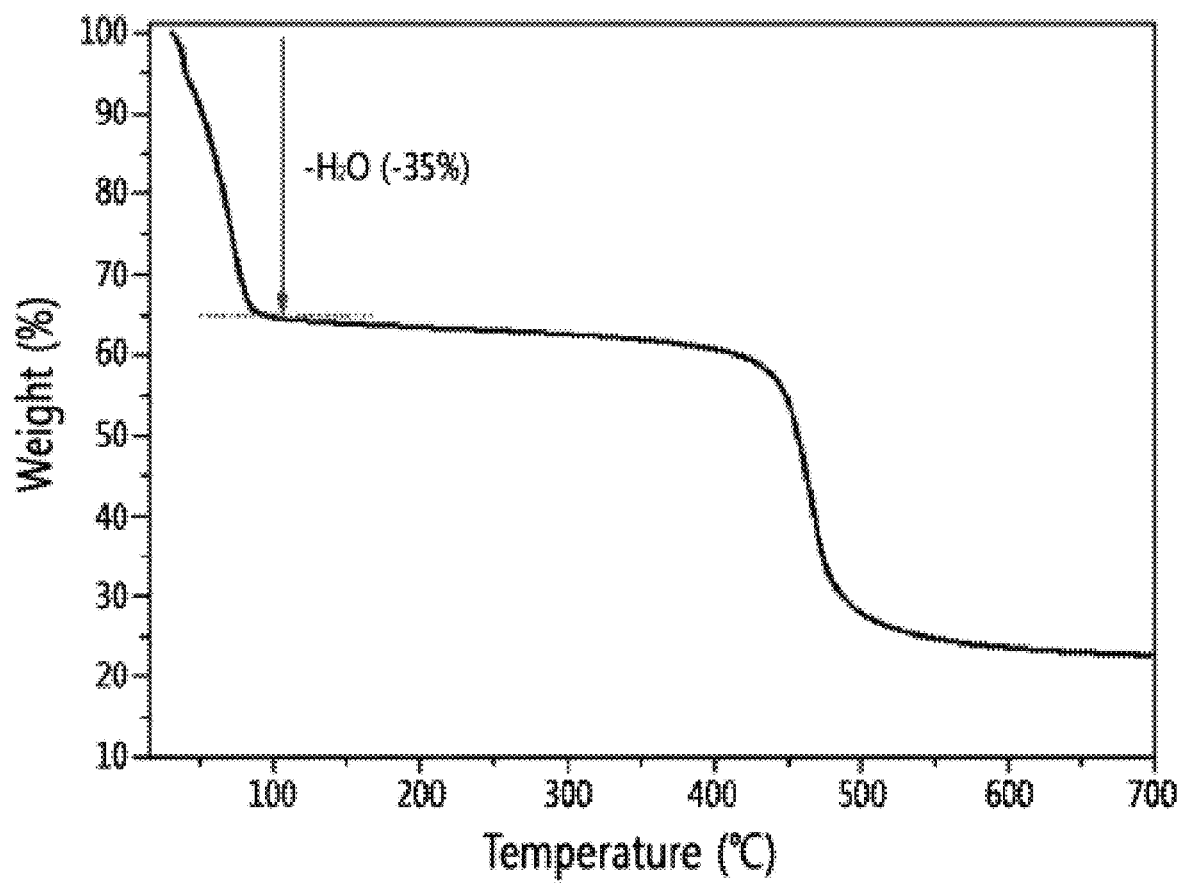
FIG. 7 shows a thermogravimetric analysis graph of Al-Fumarate sample, which was measured from room temperature to 700° C. at a heating rate of 5° C. per minute under nitrogen atmosphere.

As shown in FIG. 7, a thermogravimetric analysis of the Al-Fumarate material obtained by the synthesis confirmed that the adsorption amount calculated from the water amount desorbed at 100° C. or lower was up to 0.53 g/g, indicating applicability of the material as a water adsorbent. Further, the rapid weight reduction at 400-450° C. was caused by a weight reduction due to destruction of the crystal structure, and Al-Fumarate was confirmed to be thermally stable up to 400° C.

Figure 8:
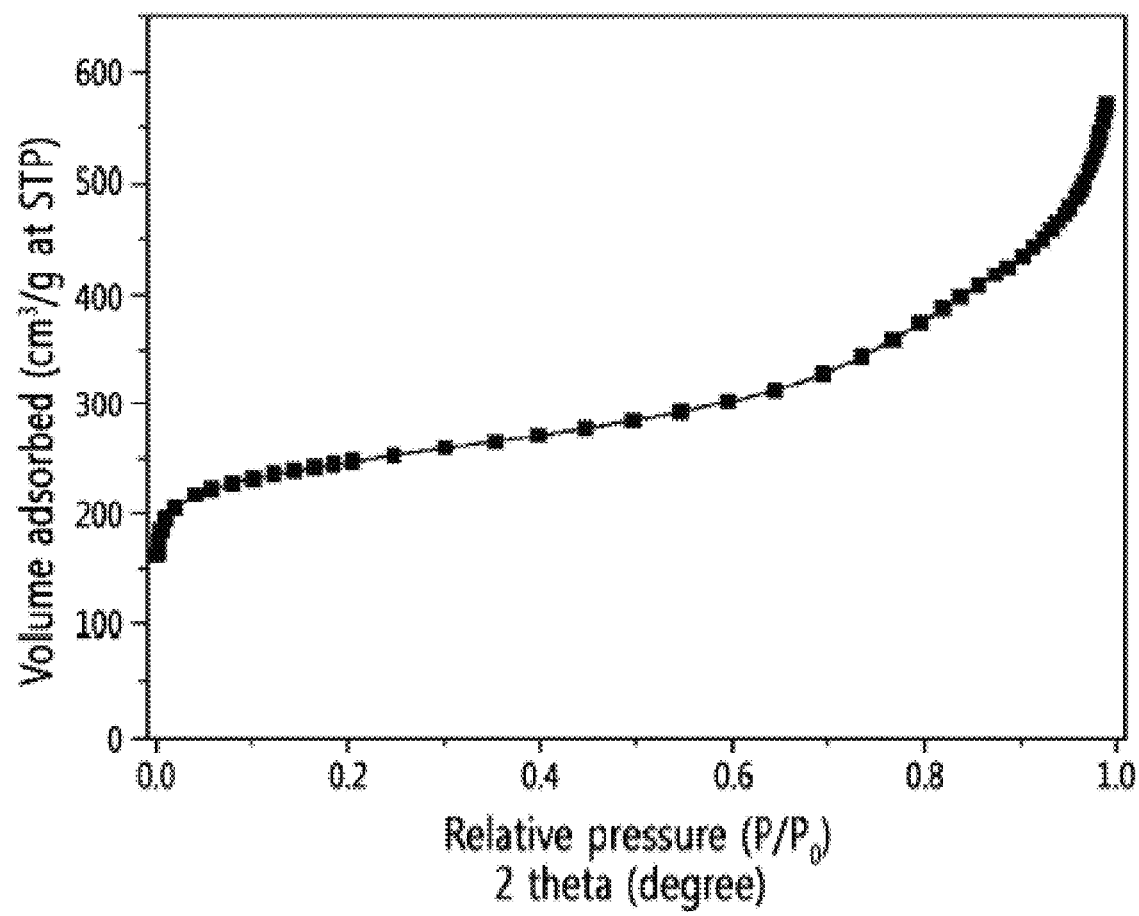
FIG. 8 shows a nitrogen physical adsorption isotherm for Al-Fumarate organic-inorganic hybrid nanoporous material, which was measured at a liquid nitrogen temperature (−195° C.)

To measure a specific surface area and a nanopore volume of the Al-Fumarate material obtained by the synthesis, the Al-Fumarate material was treated at a pretreatment temperature of 150° C. for 12 hours, and then a physical adsorption of nitrogen was measured at −196° C. As shown in FIG. 8, a nitrogen physical adsorption isotherm at −196° C. showed Type-I isotherm, and a calculated BET surface area was 1050 m²/g, and a nanopore volume at p/p0=0.95 was 0.60 cm³/g. The water adsorption isotherm at room temperature of 25° C. showed a S shaped curve with abrupt increasing adsorption amount at p/p0=0.4-0.5, and a reversible desorption isotherm was obtained.

Example 3: Synthesis and Adsorption Property of Aluminum Furandicarboxylate (Al-FDC) Material An organic-inorganic hybrid nanoporous material, Al-FDC was synthesized as follows. First, 30 mmol of 2,5-furan dicarboxylic acid, 30 mmol of AlCl₃.6H₂O, 30 mmol of NaOH, and 60 mL of deionized water were placed in a 100 ml-3 neck round bottom flask, and mixed with each other at room temperature for 3 hours, followed by heating at 100° C. under stirring at reflux for 24 hours. After being cooled to room temperature, a product was recovered by centrifugation.

The organic-inorganic hybrid nanoporous materials are known to have different structures and material compositions depending on coordination and bond formation, even though they are composed of the same metal ions and organic ligands. X-ray diffraction patterns measured by using Al-FDC powder were the same as the patterns suggested in Advanced materials, Vol 27(32), 4775-4780, 2015. The Al-FDC material has Chemical Formula of [Al(OH) [(O₂C)—C₄OH₂—(CO₂)].n (solvent) (wherein the solvent is H₂O, and n is a real number ranging from 0.1 to 10), and Al-FDC after being dried at 150° C. or higher has Chemical Formula of [Al(OH)[(O₂C)—C₄OH₂—(CO₂)]. A BET surface area was 1070 m²/g, and a nanopore volume was 0.398 cm³/g.

A water adsorption property of the Al-FDC material was measured by using an IGA gravimetric adsorption analyzer manufactured by Hiden. In this regard, for pretreatment, the Al-FDC material was dried at a vacuum level of 10⁻⁵ Torr and a temperature of 150° C. for 6 hours, and then temperature was decreased to 30° C. to measure adsorption and desorption isotherms at a ratio of water vapor pressure to saturated vapor pressure (p/p0) ranging from 0~1.0. The water adsorption/desorption isotherms of Al-FDC has a characteristic of having S-shaped reversible isotherm in an almost saturated form at p/p0<0.20, as in the above-mentioned Advanced materials, Vol 27(32), 4775-4780, 2015. In this range, Al-FDC showed a high adsorption amount close to 0.35 g per 1 g. The Al—OH groups and polar heterocyclic organic ligands in the framework of Al-FDC increase hydrophilicity of the organic-inorganic hybrid nanoporous material and also interact with water molecules in an appropriate strength, and therefore, the Al-FDC material is regenerable at a much lower temperature, compared to zeolite.

Example 4: Synthesis and Characterization of Iron Benzentricarboxylate (MIL-100(Fe)) Material An organic-inorganic hybrid nanoporous material, Iron benzenetricarboxylate (MIL-100(Fe)) was synthesized as follows. First, Fe(NO₃)₃.9H₂O (10.33 g), 1,3,5-benzenetricarboxylic acid (3.6 g), and 10.2 mL of H₂O were reacted in a 100 mL microwave reactor (MARS-5) at 180° C. for 1 hour. To remove unreacted ligand residues, the synthesized compound was washed with an excessive amount of ethanol, and filtered and dried.

Figure 9:
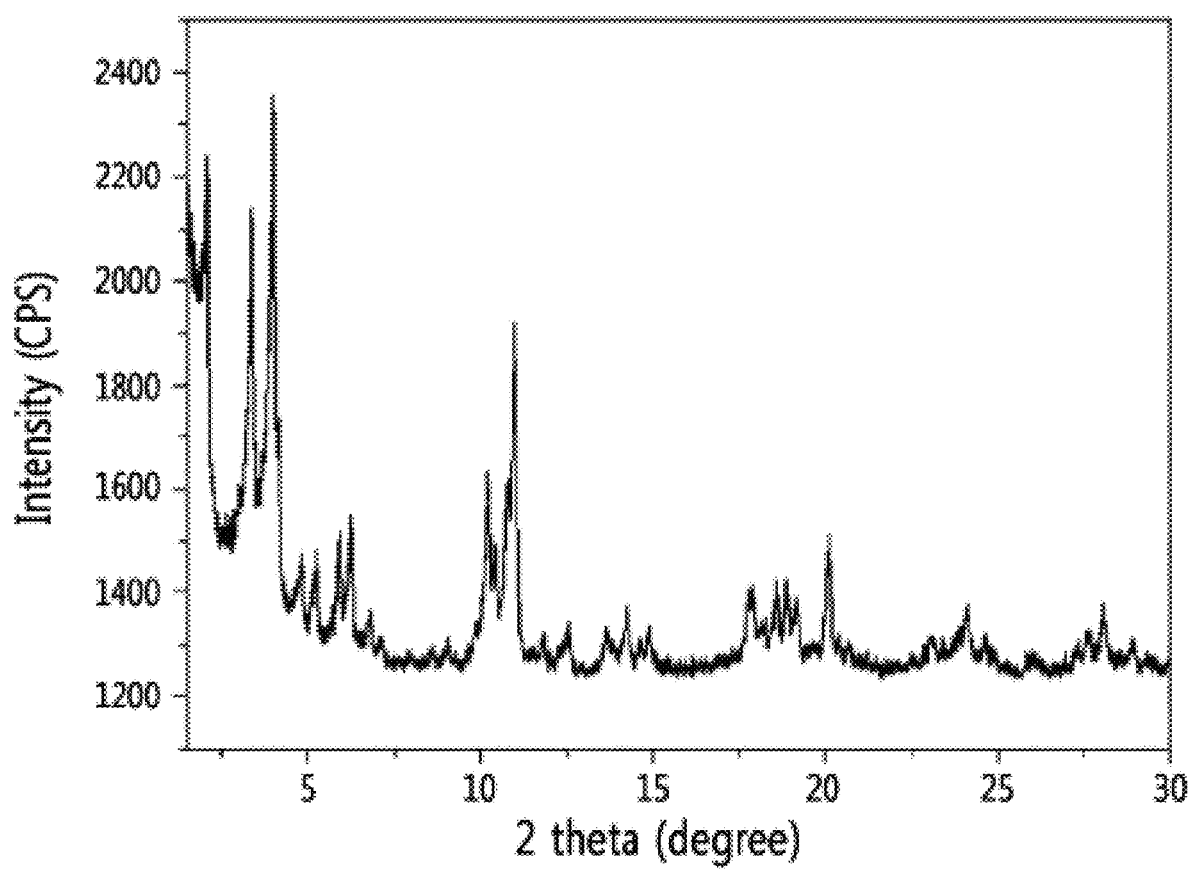
FIG. 9 shows result of X-ray diffraction analysis of MIL-100(Fe) organic-inorganic hybrid nanoporous material.

MIL-100(Fe) material obtained by the synthesis has Chemical Formula of [Fe₂O(OH)[(O₂C)—C₆H₄—(CO₂)].n (solvent) (wherein the solvent is H₂O), and MIL-100(Fe) after being dried at 100° C. has Chemical Formula of [Fe₃O(OH)[(O₂C)—C₆H₄—(CO₂)]. With regard to a structure of MIL-100(Fe) calculated by X-ray diffraction analysis, as shown in FIG. 9, MIL-100(Fe) was confirmed to crystallize in a regular hexahedral space group Fd3m having a diameter of ~6.5 Å and two pore sizes of 25~30 Å and a cell parameter of a=71.26 Å.

Figure 10:
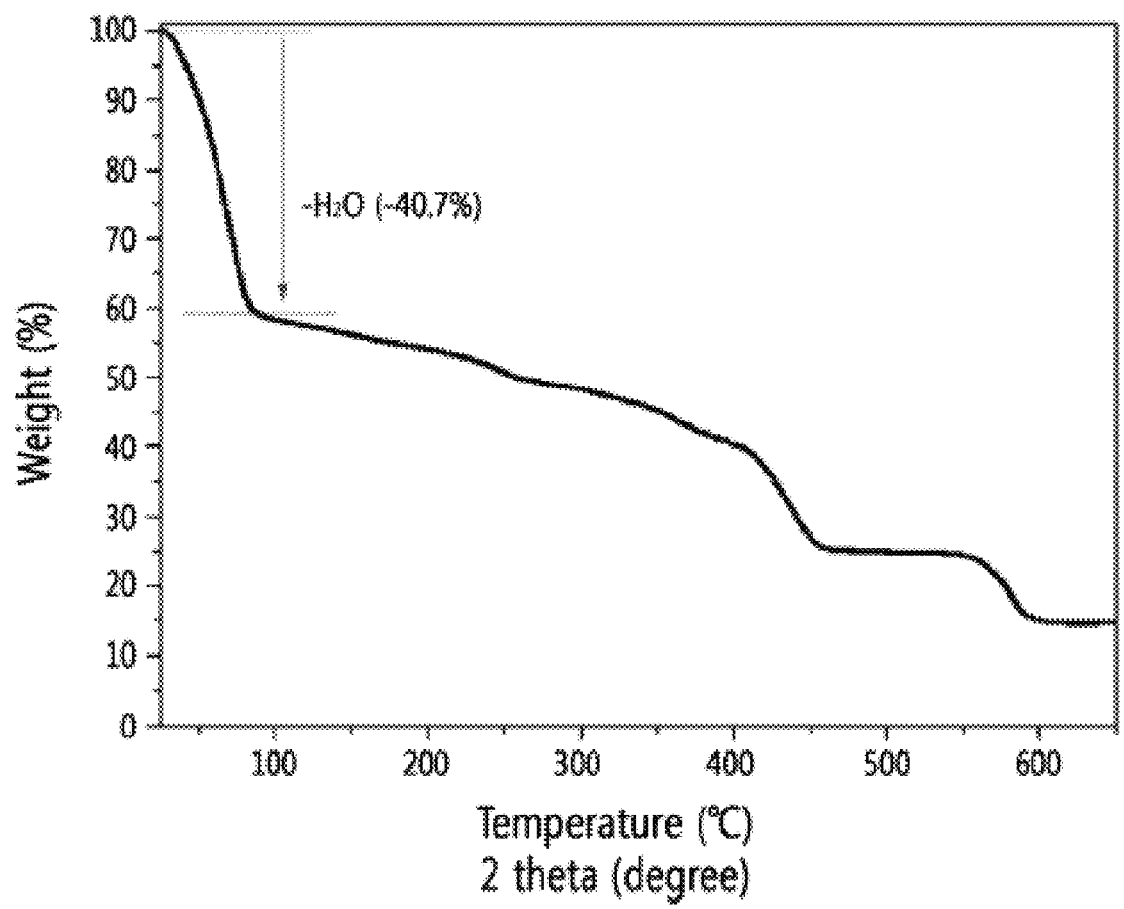
FIG. 10 shows a thermogravimetric analysis graph of Al-Fumarate sample, which was measured from room temperature to 650° C. at a heating rate of 5° C. per minute under nitrogen atmosphere.

The result of thermogravimetric analysis of MIL-100(Fe) material obtained by the synthesis is shown in FIG. 10. 40.7% of water was desorbed at 100° C. or lower, and weight loss occurred in the range of 100° C. to 400° C., which is attributed to water strongly adsorbed or water desorbed from metal clusters, suggesting that the MIL-100 (Fe) organic-inorganic hybrid nanoporous material has a site strongly adsorbing water.

Figure 11:
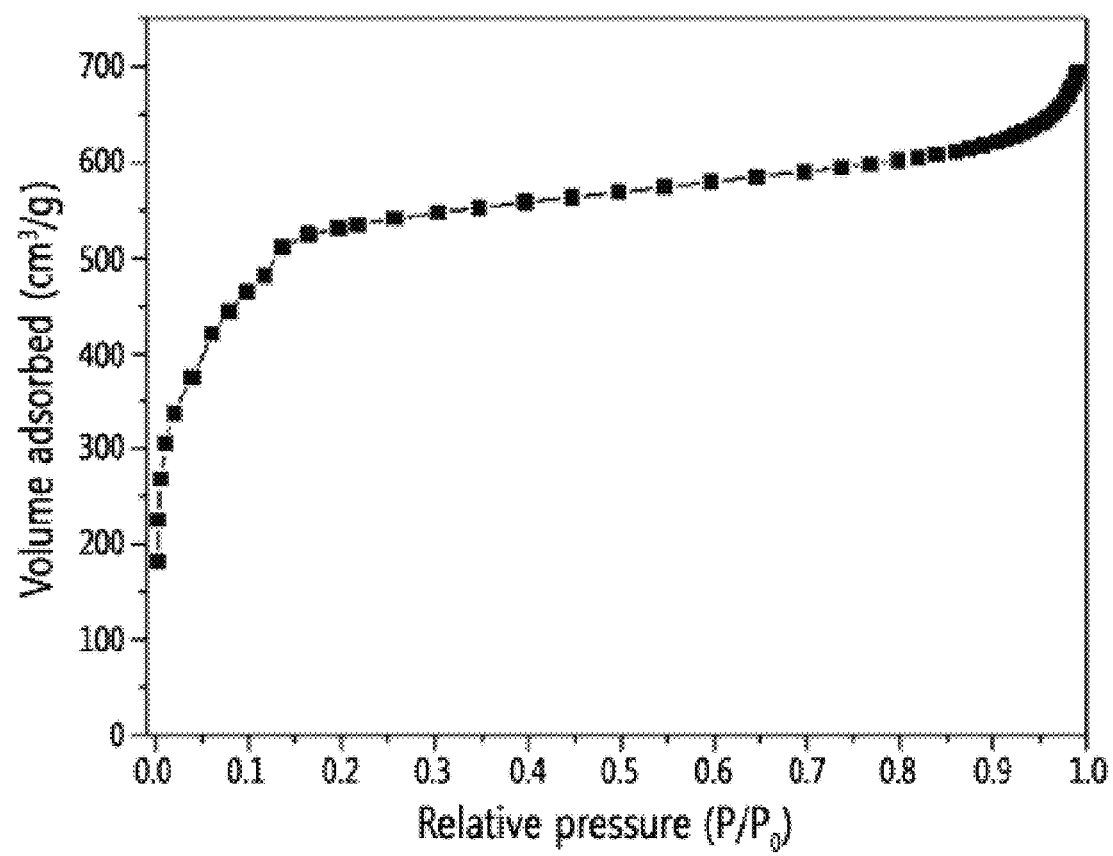
FIG. 11 shows a nitrogen physical adsorption isotherm for MIL-100(Fe) organic-inorganic hybrid nanoporous material, which was measured at a liquid nitrogen temperature (−195° C.)
Figure 12:
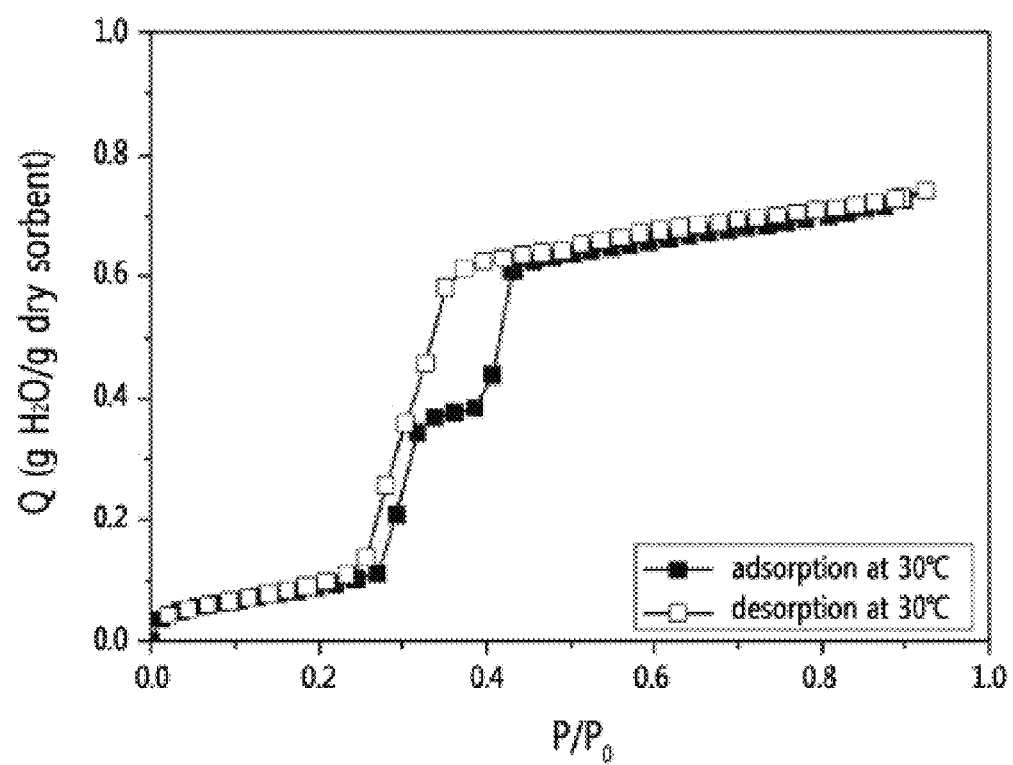
FIG. 12 shows a water adsorption/desorption isotherm for MIL-100(Fe), which was measured at 30° C.

To measure a specific surface area and a nanopore volume of the MIL-100(Fe) material obtained by the synthesis, the MIL-100(Fe) material was treated at a pretreatment temperature of 250° C. for 6 hours, and then a nitrogen physical adsorption experiment was performed at −196° C., and water adsorption/desorption isotherms were measured at 30° C. As shown in FIG. 11, a nitrogen physical adsorption isotherm at −196° C. showed Type-I isotherm, and a calculated BET surface area was 1950 m²/g, and a nanopore volume at p/p0=0.95 was 1.2 cm³/g. As shown in FIG. 12, the water adsorption isotherm at room temperature of 30° C. showed a S shaped curve with abrupt increasing adsorption amount at p/p0=0.25-0.45, and two-stage adsorption occurred, and the desorption isotherm exhibited a small hysteresis. The water adsorption amount was up to 0.74 g/g, indicating applicability as a water adsorbent.

Experimental Example 1: Test of Water Adsorption of Organic-Inorganic Hybrid Nanoporous Material Mixed with Cathode Active Material

[Preparation of Test Samples]

A commercially available LiFePO$_4$ cathode active material (Alfa) was physically mixed with Al-FDC, Al-Fumarate, and MIL-100(Fe) organic-inorganic hybrid nanoporous materials which were prepared in Examples 1, 2, and 3, respectively at a weight ratio of 10% to prepare cathode active materials mixed with the organic-inorganic hybrid nanoporous materials.

[Test of Water Adsorption of Test Samples]

Figure 13:
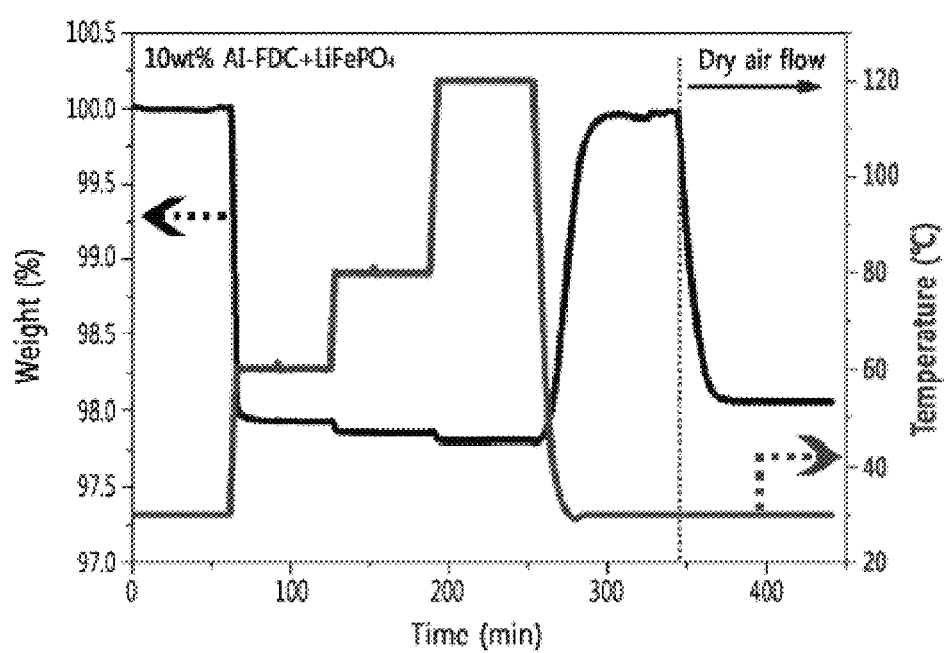
FIG. 13 shows result of a water adsorption test of LiFePO$_4$ cathode active material including 10% by weight of Al(OH)BDC under air flow at a relative humidity of 10%.
Figure 14:
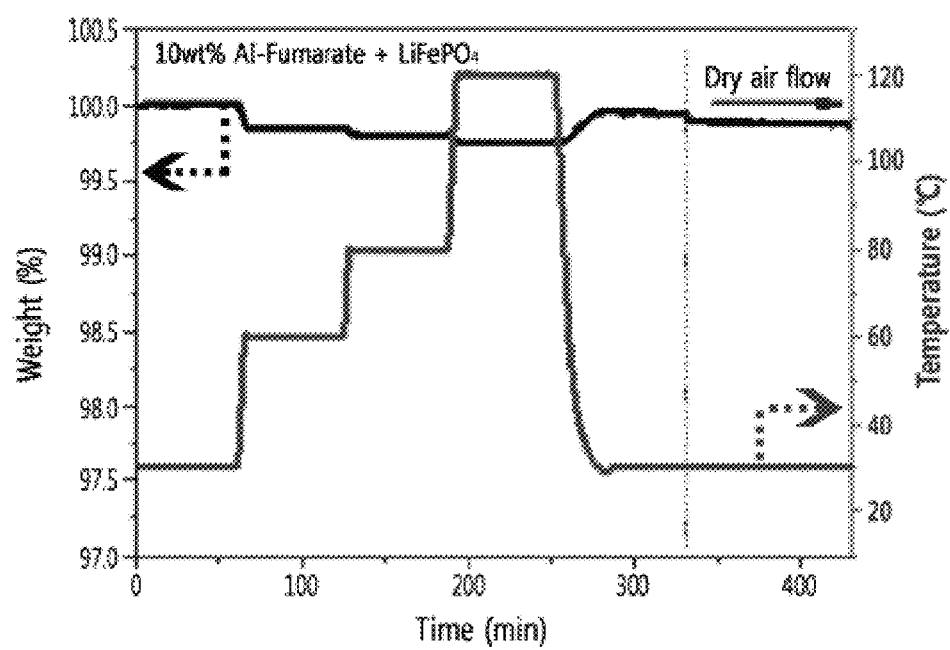
FIG. 14 shows result of a water adsorption test of LiFePO$_4$ cathode active material including 10% by weight of Al-Fu under air flow at a relative humidity of 10%.
Figure 15:
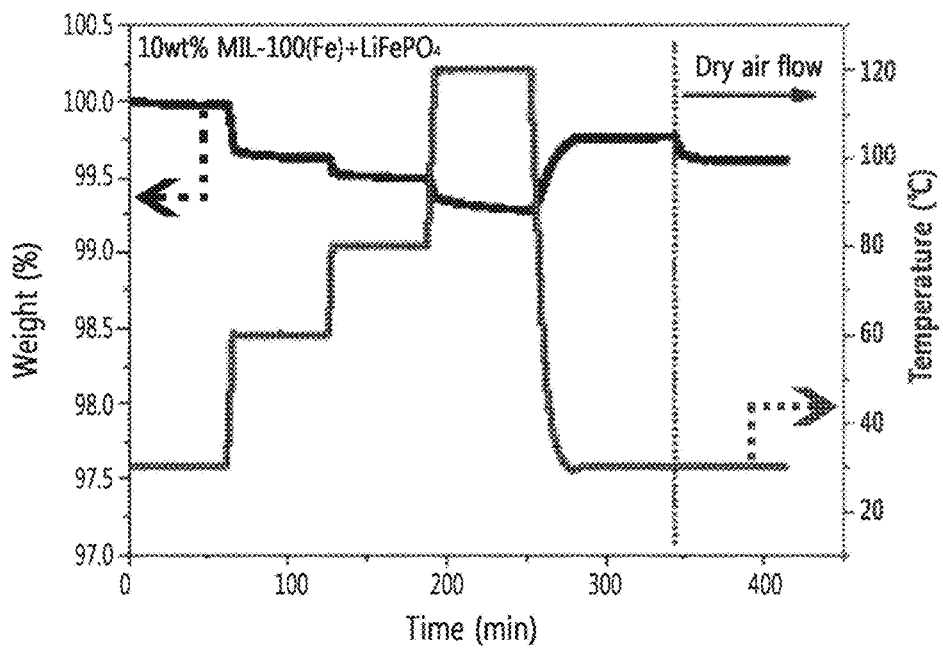
FIG. 15 shows result of a water adsorption test of LiFePO$_4$ cathode active material including 10% by weight of MIL-100(Fe) under air flow at a relative humidity of 10%.
Figure 16:
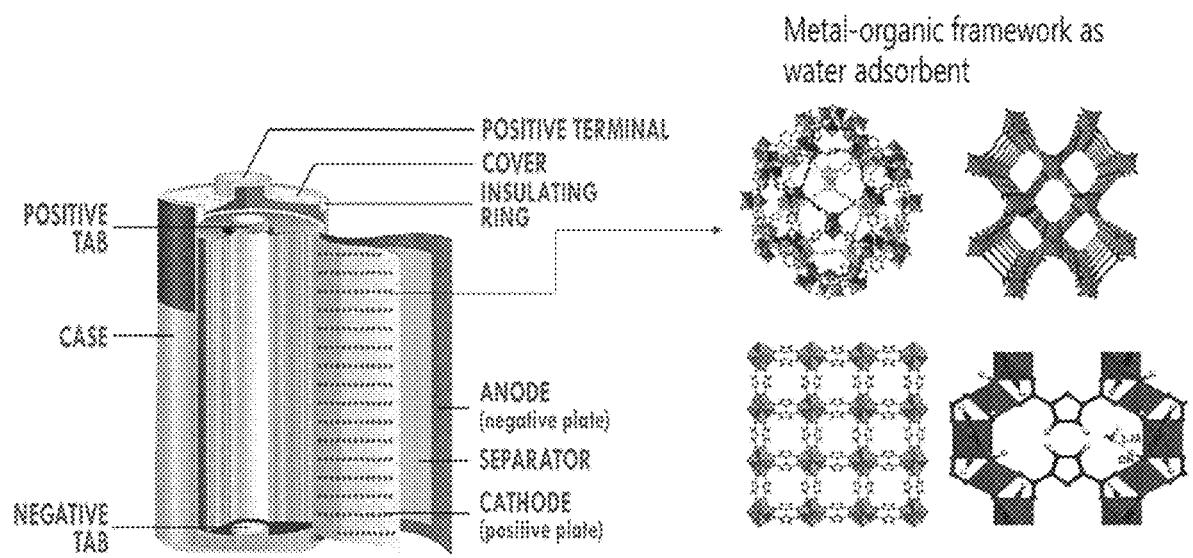
FIG. 16 shows a schematic diagram of a secondary battery having metal-organic framework as an adsorbent according to an embodiment of the present invention.

To confirm water adsorption properties of the test samples at a relative humidity of 10% or less, a thermogravimetric analyzer connected with a relative humidity-controllable air injector was used to perform a test. The test sample was loaded on the analyzer, and then air containing water at a relative humidity of 10% was injected into the test sample until equilibrium was reached, and the sample was saturated with water so that the weight change was 0.02% or less. Then, while temperature of the plate on which the test sample was loaded was raised to 60° C., 80° C., 120° C., a water desorption amount was examined. Thereafter, when temperature was decreased to 30° C., a water adsorption amount was examined. Changes in the water adsorption amount of the test sample were observed for about 1 hour under air flow at a relative humidity of 10%, and water-free dry air was injected and the water desorption amount at 30° C. was compared. The results of water adsorption are shown in FIGS. 13 to 15. Adsorption/desorption performances of the Al-FDC and LiFePO$_4$ test samples in FIG. 13 showed that 90% or more of adsorbed water was desorbed based on 10% of organic-inorganic hybrid nanoporous material in the total weight of the test sample when temperature was raised to 60° C. at a relative humidity of 10% (p/p0=0.1). Further, the desorption amount at 120° C. was 0.217 g/g MOF, and all of the water adsorbed at a relative humidity of 10% was removed. When temperature was decreased from 120° C. to 30° C., the amount of water corresponding to the desorption amount of water was re-adsorbed. This result indicates that the adsorbent also reversibly desorbs adsorbed water at 120° C., and therefore, the adsorbent is advantageous for removing water during a process of assembling a battery. It was also confirmed that the adsorbent of the organic-inorganic hybrid nanoporous material re-adsorbs water in an amount corresponding to the desorption amount of water, indicating that the adsorbent has excellent adsorption/desorption regeneration. When dry air was applied to the adsorbent saturated at 30° C. and a relative humidity of 10%, 88% (0.191 g/g MOF) of adsorbed water was desorbed and 12% (0.026 g/g) of adsorbed water was not desorbed from the adsorbent. These results suggest that the organic-inorganic hybrid nanoporous material is an adsorbent for a secondary battery capable of effectively removing a trace amount of water during assembling or operating of the secondary battery. As shown in FIG. 14, adsorption capacity of the Al-Fumarate organic-inorganic hybrid nanoporous material at a relative humidity of 10% (p/p0=0.1) was 0.02 g/g MOF, which was 10 times smaller than that of Al(OH)BDC, but a desorption rate under dry condition was 350%, and 65% of water (0.013 g/g MOF) was not desorbed even under dry condition. The water adsorption amount of the Al-Fumarate adsorbent under dry condition was 50% of that of Al(OH) BDC, indicating applicability of the Al-Fumarate adsorbent as a water adsorbent for secondary batteries. As shown in FIG. 15, adsorption capacity of MIL-100 at a relative humidity of 10% was 0.050 g/g MOF, and a desorption rate under dry condition was 32% (0.016 g/g MOF). MIL-100 adsorbent also showed strong water adsorption strength at a relative humidity of 10, or less, similar to Al-Fumarate adsorbent. However, the water adsorption amount of MIL-100 adsorbent under dry condition was 0.034 g/g MOF, which was higher than that of Al(OH)BDC. This is due to the water adsorption point created by the unsaturated metal site during the heat treatment process Water may be effectively adsorbed at a relative humidity of 10% (p/p0=0.1 or less) or less, and therefore, several hundreds of ppm of water which may be generated during assembling or operating of the secondary battery may be effectively removed.

Preparation Example 1: Preparation of Secondary Battery (Adsorbent Applied)

[Preparation of Anode Active Material]

An anode mixture slurry was prepared by mixing 94 wt % of carbon powder having an average diameter of 20 μm as an anode active material, 2 wt % of Al-FDCA powder having an average diameter of 0.5 μm to 1 μm, 1 wt % of carbon black as a conductive material, and 3 wt % of polyvinylidene fluoride (PVdF) as a binder, followed by adding the mixture to a solvent N-methyl-2-pyrrolidone (NMP). The thus-prepared anode mixture was coated on the copper thin film, the thickness of which was 15 μm, using a dip coating device and dried. An anode was then prepared using a roll press.

[Preparation of Cathode Active Material]

A cathode mixture slurry was prepared by mixing 92 wt % of lithium cobalt oxide (LiCoO2) powder having an average diameter of 2 μm to 5 μm as a cathode active material, 2 wt % of Al-FDCA powder having an average diameter of 0.5 μm to 1 μm, 3 wt % of carbon black as a conductive material, and 3 wt % of polyvinylidene fluoride (PVdF) as a binder, followed by adding the mixture to a solvent N-methyl-2-pyrrolidone (NMP). The thus-prepared cathode mixture was coated on the aluminum thin film, the thickness of which was 20 μm, using a dip coating device and dried. A cathode was then prepared using a roll press.

About 5 wt % of polyvinylidene fluoride-co-chlorotrifluoroethylene polymer (PVdF-CTFE polymer) was added to acetone and dissolved at 50° C. for at least 12 hours to prepare a polymer solution. Solid Al-FDCA at a concentration of about 10 wt % was added to the thus-prepared polymer solution, and pulverized and dispersed for at least 12 hours using a ball mill method to prepare a slurry. The Al-FDCA powder, having an average diameter of 0.5 μm to 1 μm, was added to prepare the slurry. The slurry was then coated on the surface of the roll to a thickness of about 15 μm using a spray coating method and was dried.

Comparative Example 1: Preparation of Secondary Battery (Adsorbent not Applied)

[Preparation of Anode Active Material]

An anode mixture slurry was prepared by mixing 96 wt % of carbon powder having an average diameter of 20 pin as an anode active material, 1 wt % of carbon black as a conductive material, and 3 wt % of polyvinylidene fluoride (PVdF) as a binder, followed by adding the mixture to a solvent N-methyl-2-pyrrolidone (NMP). The thus-prepared anode mixture was coated on the copper thin film, the thickness of which was 15 μm, using a dip coating device and dried. An anode was then prepared using a roll press.

[Preparation of Cathode Active Material]

A cathode mixture slurry was prepared by mixing 94 wt % of lithium cobalt oxide (LiCoO2) powder having an average diameter of 2 μm to 5 μm as a cathode active material, 3 wt % of carbon black as a conductive material, and 3 wt % of polyvinylidene fluoride (PVdF) as a binder, followed by adding the mixture to a solvent N-methyl-2-pyrrolidone (NMP). The thus-prepared cathode mixture was coated on the aluminum thin film, the thickness of which was 20 μm, using a dip coating device and dried. A cathode was then prepared using a roll press.

About 5 wt % of polyvinylidene fluoride-co-chlorotrifluoroethylene polymer (VdF-CTFE polymer) was added to acetone and dissolved at 50° C. for at least 12 hours to prepare a polymer solution. The thus-prepared polymer solution was coated on the surface of the roll to a thickness of about 15 μm using a spray coating method and dried.

[Accommodation of Electrode Assembly and Injection of Electrolyte]

A secondary battery was prepared by accommodating the roll-type electrode assembly in a cylinder-type battery case, and injecting an electrolyte (vinyl carbonate/ethylene carbonate (EC)/propylene carbonate (PC)/diethyl carbonate (DEC)=3/32/25/45 wt %), followed by injecting lithium hexafluorophosphate (LiPF6) in an amount of 1 mol/kg based on the electrolyte.

[Assay on the Charge/Discharge Stability of the Secondary Battery]

The prepared secondary battery was charged at a fixed current of 1 C until it reached 4.2 V, and further charged for 4 hours under a fixed charging condition of 4.2 V.

The battery was then discharged at a current of 1200 mA until the voltage thereof reached 3.0 V.

Using the formula [stability index=first battery capacity/battery capacity at 100th cycle test×100], the first and the 100th charge/discharge capacities were calculated. In the case of the secondary battery prepared as a comparative example, the stability index was 54%, whereas the secondary battery including organic-inorganic hybrid nanoporous materials as the adsorbent showed a stability index of 93%, indicating a stable charge/discharge capacity.

Effect of the Invention

When a first organic-inorganic hybrid nanoporous material which may be regenerated by desorbing 70% or more, preferably 80% or more of a total adsorption amount of adsorbed water at 150° C. or lower according to the present invention is used as a water adsorbent for a secondary battery, high water adsorption capacity may be achieved, and water adsorbed by the water adsorbent during manufacturing of the secondary battery may be desorbed by vacuum treatment at 150° C. or lower during assembling of the battery, thereby being removed from the battery. Furthermore, when a second organic-inorganic hybrid nanoporous material, of which water adsorption capacity is higher than water desorption capacity at a relative humidity p/p0 of 0.3 or less, is further used in addition to the first organic-inorganic hybrid nanoporous material, gas components which may be generated during operation of the battery may be effectively adsorbed and may not be desorbed. Accordingly, side-reactions by water may be prevented, thereby improving reliability of the battery. Further, deterioration of storage and life-time characteristics of the battery due to swelling by carbon dioxide may be prevented.

What is claimed is:

1. A secondary battery having a battery case which accommodates an electrode assembly including a cathode, an anode, and a separator disposed between the cathode and the anode, together with an electrolyte,
    wherein the electrolyte includes a first organic-inorganic hybrid nanoporous material as a water adsorbent which is regenerated by desorbing 70% or more of a total adsorption amount of adsorbed water at 150° C. or lower, or wherein the first organic-inorganic hybrid nanoporous material forms a coating layer on a surface of one or more selected from the group consisting of the cathode, the anode, the separator, and the interior of the battery case, and
    wherein the first organic-inorganic hybrid nanoporous material has a crystalline framework that includes a polar metal ion and a carboxylate oxygen anion in the framework.

2. The secondary battery of claim 1, further comprising a second organic-inorganic hybrid nanoporous material, of which water adsorption capacity is higher than water desorption capacity at a relative humidity p/p0 of 0.3 or less (herein, p0 represents a saturated vapor pressure at an application temperature and p represents a vapor pressure upon adsorption),
    wherein the second organic-inorganic hybrid nanoporous material has a crystalline framework that includes a polar metal ion and a carboxylate oxygen anion in the framework.

3. The secondary battery of claim 2, wherein the second organic-inorganic hybrid nanoporous material has a coordinatively unsaturated metal site with a density of 0.2 mmol/g to 10 mmol/g.

4. The secondary battery of claim 2, wherein the first organic-inorganic hybrid nanoporous material is disposed in a position where water is adsorbed and desorbed during manufacturing of the battery, and the second organic-inorganic hybrid nanoporous material is disposed in a position where water generated during operation of the battery is adsorbed.

5. The secondary battery of claim 2, wherein the second organic-inorganic hybrid nanoporous material forms a coating layer on the surface of one or more selected from the group consisting of the cathode, the anode, the separator, and the interior of the battery case.

6. The secondary battery of claim 1, wherein the first organic-inorganic hybrid nanoporous material is regenerated by desorbing 50% or more of a total adsorption amount of adsorbed water at 100° C. or lower.

7. The secondary battery of claim 1, wherein the first organic-inorganic hybrid nanoporous material adsorbs 50% or more of a total adsorption amount of water at a relative humidity p/p0 ranging from 0.3 to 0.6 (herein, p0 represents a saturated vapor pressure at an application temperature and p represents a vapor pressure upon adsorption).

8. The secondary battery of claim 1, wherein the first organic-inorganic hybrid nanoporous material is an organic-inorganic hybrid nanoporous material having 0.5 mol to 3 mol of a hydrophilic hydroxyl group (OH) or a hydroxide anion (OH$^-$) group as a ligand per 1 mol of a central metal ion in a nanopore.

9. The secondary battery of claim 1, wherein the first organic-inorganic hybrid nanoporous material has a central metal ion having no unshared electron pairs.

10. The secondary battery of claim 1, wherein the first organic-inorganic hybrid nanoporous material includes one or more metal ions selected from the group consisting of aluminum ion, calcium ion, magnesium ion, and zirconium ion as a central metal ion.

11. The secondary battery of claim 1, wherein the first organic-inorganic hybrid nanoporous material has a heterocyclic dicarboxylic acid anion as a ligand.

12. The secondary battery of claim 1, wherein the first organic-inorganic hybrid nanoporous material or the second organic-inorganic hybrid nanoporous material adsorbs carbon dioxide, HF, or both of them.

13. The secondary battery of claim 1, wherein the secondary battery is a lithium ion battery, a lithium ion polymer battery, or a lithium polymer battery.

14. A battery module comprising the secondary battery of claim 1 as a unit battery.

15. A battery pack comprising the battery module of claim 14.

16. A device comprising the battery pack of claim 15 as a power source.

17. An electrolyte comprising, as a water adsorbent,
a first organic-inorganic hybrid nanoporous material which is regenerated by desorbing 70% or more of a total adsorption amount of adsorbed water at 150° C. or lower, wherein the first organic-inorganic hybrid nanoporous material has a crystalline framework that includes a polar metal ion and a carboxylate oxygen anion in the framework; or
a second organic-inorganic hybrid nanoporous material, of which water adsorption capacity is higher than water desorption capacity at a relative humidity p/p0 of 0.3 or less (herein, p0 represents a saturated vapor pressure at an application temperature and p represents a vapor pressure upon adsorption), wherein the second organic-inorganic hybrid nanoporous material has a crystalline framework that includes a polar metal ion and a carboxylate oxygen anion in the framework; or
both of them,
wherein the electrolyte further comprises a lithium salt or a non-protic organic solvent.

18. An electrode active material composition comprising, as a water adsorbent,
a first organic-inorganic hybrid nanoporous material which is regenerated by desorbing 70% or more of a total adsorption amount of adsorbed water at 150° C. or lower; or
a second organic-inorganic hybrid nanoporous material, of which water adsorption capacity is higher than water desorption capacity at a relative humidity p/p0 of 0.3 or less (herein, p0 represents a saturated vapor pressure at an application temperature and p represents a vapor pressure upon adsorption); or
both of them,
wherein the first or second organic-inorganic hybrid nanoporous material forms a coating layer on a surface of the electrode active material composition, and
wherein the first or second organic-inorganic hybrid nanoporous material has a crystalline framework that includes a polar metal ion and a carboxylate oxygen anion in the framework.

19. A method of manufacturing the secondary battery of claim 1, the method comprising the step of adsorbing water during manufacturing of the battery and desorbing water during assembling of the battery by using a first organic-inorganic hybrid nanoporous material which is regenerated by desorbing 70% or more of a total adsorption amount of adsorbed water at 150° C. or lower.

20. The method of claim 19, further comprising the step of disposing a second organic-inorganic hybrid nanoporous material, of which water adsorption capacity is higher than water desorption capacity at a relative humidity p/p0 of 0.3 or less, in the position where water generated during operation of the battery is adsorbed.

* * * * *